United States Patent
Coupin

(10) Patent No.: US 10,597,514 B2
(45) Date of Patent: Mar. 24, 2020

(54) COMPOSITION COMPRISING POLY-LACTIDE-BASED POLYMER

(71) Applicant: TOTAL RESEARCH & TECHNOLOGY FELUY, Seneffe (BE)

(72) Inventor: Thierry Coupin, Carnieres (BE)

(73) Assignee: TOTAL RESEARCH & TECHNOLOGY FELUY, Seneffe (BE)

(*) Notice: Subject to any disclaimer, the term of this patent is extended or adjusted under 35 U.S.C. 154(b) by 79 days.

(21) Appl. No.: 15/317,485

(22) PCT Filed: Jun. 23, 2015

(86) PCT No.: PCT/EP2015/064102
§ 371 (c)(1),
(2) Date: Dec. 9, 2016

(87) PCT Pub. No.: WO2015/197610
PCT Pub. Date: Dec. 30, 2015

(65) Prior Publication Data
US 2017/0121496 A1    May 4, 2017

(30) Foreign Application Priority Data

Jun. 24, 2014 (EP) .................................. 14173692

(51) Int. Cl.
C08K 5/11 (2006.01)
C08K 5/12 (2006.01)
C08J 3/20 (2006.01)

(52) U.S. Cl.
CPC ............ C08K 5/11 (2013.01); C08J 3/203 (2013.01); C08K 5/12 (2013.01); C08J 2367/04 (2013.01)

(58) Field of Classification Search
CPC ....................................................... C08K 5/11
See application file for complete search history.

(56) References Cited

U.S. PATENT DOCUMENTS

| 2011/0144241 A1* | 6/2011 | Yoshino | C08L 67/04 524/35 |
| 2012/0270979 A1* | 10/2012 | Hsu | C08L 67/04 524/317 |
| 2015/0322310 A1* | 11/2015 | Taleyarkhan | B32B 7/12 428/431 |

FOREIGN PATENT DOCUMENTS

| EP | 1491523 A1 | 12/2004 | |
| EP | 1942143 A1 | 7/2008 | |
| EP | 2607428 A1 | 6/2013 | |
| EP | 2674459 A1 | 12/2013 | |
| WO | 2008037772 A1 | 4/2008 | |
| WO | WO-2009013847 A1 * | 1/2009 | ............. C08L 67/04 |
| WO | 2010133419 A2 | 11/2010 | |
| WO | 2011144625 A1 | 11/2011 | |
| WO | WO-2014078720 A1 * | 5/2014 | ............. C09J 167/04 |

OTHER PUBLICATIONS

International Search Report issued in PCT/EP2015/064102, dated Sep. 7, 2015, 4 pages.
EP Application No. 11167138; "Process for the Polymerization of Cyclic Carbonates"; Filing date: May 23, 2011; 24 pages.

* cited by examiner

Primary Examiner — Michael F Pepitone
(74) Attorney, Agent, or Firm — Albert Shung

(57) ABSTRACT

A composition includes a polymer having a poly-lactide and at least one compound of formula (I),

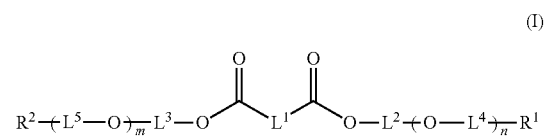

where $L^1$ is $C_{1-8}$alkylene or $C_{3-6}$cycloalkylene; $L^2$ is $C_{1-6}$alkylene; $L^3$ is $C_{1-6}$alkylene; $L^4$ is $C_{1-6}$alkylene; $L^5$ is $C_{1-6}$alkylene; n is an integer selected from 1, 2, 3 or 4; m is an integer selected from 1, 2, 3 or 4; $R^1$ is H; or $C_{1-6}$alkyl; $R^2$ is H; or $C_{1-6}$alkyl. The poly-lactide is poly-L-lactide comprising a content of D isomer of at least 10% by weight based on the total weight of the poly-L-lactide; poly-D-lactide comprising a content of L isomer of at least 10% by weight based on the total weight of the poly-D-lactide; poly-DL-lactide; poly(meso-lactide); or mixtures thereof.

15 Claims, 8 Drawing Sheets

COMPOSITION COMPRISING POLY-LACTIDE-BASED POLYMER

CROSS-REFERENCE TO RELATED APPLICATIONS

This application is a National Stage Entry of PCT/EP2015/064102, filed on Jun. 23, 2015; which itself claims priority from EP 14173692.6, filed on Jun. 24, 2014. The entireties of both PCT/EP2015/064102 and EP 14173692.6 are incorporated herein by reference.

FIELD OF THE INVENTION

The invention pertains to a composition comprising a poly-lactide-based polymer, and to the use of this composition to produce a self-healing material.

BACKGROUND OF THE INVENTION

Poly-lactide or polylactic acid (PLA) is a synthetic aliphatic polyester derived from renewal resources, such a corn, sugar beet and cassava, which can ultimately be degraded under composting conditions. Polymers such as PLA have received particular attention, notably for partly replacing certain articles and mouldings in polyvinyl chloride (PVC), which despite their good balance of properties have certain shortcomings.

Although attempts have been made to utilize PLA for various end-use applications, PLA is known to be brittle and exhibit low toughness, which can result in low impact strength products or articles. In addition, when damaged, PLA items exhibit an irreversible weakness due to the cicatrices.

Impact resistance of PLA can be modified by using existing polymeric impact modifiers; however, currently available polymeric impact modifiers always decrease transparency of PLA comprising material. Liquid plasticizer can be used at high content (>15%) to improve impact resistance of PLA, however during the life time of the PLA blend, there is migration and leaching of the plasticizer.

Impact modifiers such as rubber, poly(ethylene glycol) (PEG), and acrylonitrile-butadiene-styrene copolymer (ABS) have been tested. Nevertheless, the immiscibility between these impact modifying additives and the PLA matrix is a major drawback.

Commercially available BioStrength® 150 a methyl methacrylate-butadiene-styrene co-polymer (MBS) is one of the best currently available impact modifiers for PLA; however haze of the resulting PLA material increases from 5, for pure PLA to 95 when 15% w/w of BioStrength® 150 is added.

Plasticizers are additives that increase the fluidity of a material. Commonly used plasticizers, are tributyl citrate (TBC) and acetyl tributyl citrate (ATBC). However, when 15% TBC or ATBC are mixed with PLA, the present inventors observed a plasticizer migration after storage for a few days at room temperature in summer time (25-30° C.).

In turn, Grinsted plasticizer is said not to migrate, however the present inventors observed whitening of PLA-containing Grinsted plasticizer during storage. Additionally differential scanning calorimetry (DSC) showed beginning of crystallization on aged material. Therefore, it can be said that this material is not stable during longer period of time.

There is therefore a need to improve the compositions of the prior art. There is therefore a need to develop polymer compositions obtained from renewable resources having improved impact resistance and allowing objects to be manufactured by the usual techniques of plastics processing.

SUMMARY OF THE INVENTION

According to a first aspect of the present invention, a polymer composition is provided. The composition comprises:

(a) at least one poly-lactide comprising polymer selected from the group consisting of poly-lactide, poly-lactide-polybutadiene block copolymer, poly-lactide-urethane-polybutadiene block copolymer, poly-lactide-urethane, and mixture thereof; and (b) at least one compound of formula (I),

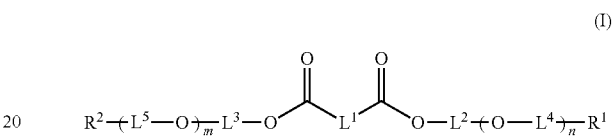

wherein,
$L^1$ is $C_{1-8}$alkylene; $C_{3-6}$cycloalkylene; each optionally substituted with one or more $C_{1-4}$alkyl;
$L^2$ is $C_{1-6}$alkylene; $L^3$ is $C_{1-6}$alkylene; $L^4$ is $C_{1-6}$alkylene; $L^5$ is $C_{1-6}$alkylene;
n is an integer selected from 1, 2, 3 or 4; m is an integer selected from 1, 2, 3 or 4;
$R^1$ is H; or $C_{1-6}$alkyl; $R^2$ is H; or $C_{1-6}$alkyl; and
wherein the poly-lactide in said poly-lactide comprising polymer is selected from poly-L-lactide comprising a content of D isomer of at least 10% by weight based on the total weight of the poly-L-lactide; poly-D-lactide comprising a content of L isomer of at least 10% by weight based on the total weight of the poly-D-lactide; poly-DL-lactide; poly(meso-lactide), and mixture thereof.

The present inventors have surprisingly found that the present compositions have an improved impact resistance. The inventors have also found that transparent compositions comprising poly-lactide-based polymer and a compound of formula (I) could be prepared and that these compositions and articles prepared therewith were impact resistant. Furthermore, no or minimal migration or leaching (exudation) of the compound of formula (I) out of the composition was observed. The present inventors have also found that the present compositions may be used in the manufacture of 3D printed articles, and that the resulting article has improved adhesion between the printed layers, which greatly stabilizes the 3D printed article, allowing for the printing of intricate and complicated shapes. In addition, the inventors have surprisingly found that the compositions of the invention present self-healing properties. The composition is especially useful for the preparation of self-healing articles.

According to a second aspect, the present invention also encompasses a process for preparing a composition according to the first aspect of the invention, comprising the step of contacting at least one poly-lactide comprising polymer with at least one compound of formula (I),

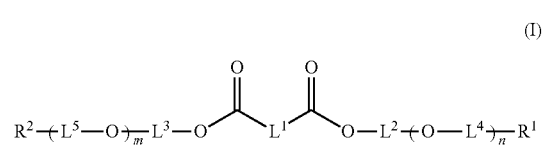

wherein said at least one poly-lactide comprising polymer is selected from the group consisting of poly-lactide, poly-lactide-polybutadiene block copolymer, poly-lactide-urethane-polybutadiene block copolymer, poly-lactide-urethane, and mixture thereof; and wherein, $L^1$ is $C_{1-8}$alkylene; $C_{3-6}$cycloalkylene; each optionally substituted with one or more $C_{1-4}$alkyl;

$L^2$ is $C_{1-6}$alkylene; $L^3$ is $C_{1-6}$alkylene; $L^4$ is $C_{1-6}$alkylene; $L^5$ is $C_{1-6}$alkylene;

n is an integer selected from 0, 1, 2, 3 or 4; m is an integer selected from 0, 1, 2, 3 or 4;

$R^1$ is H; or $C_{1-6}$alkyl; $R^2$ is H; or $C_{1-6}$alkyl;

wherein the poly-lactide in said poly-lactide comprising polymer is selected from poly-L-lactide comprising a content of D isomer of at least 10% by weight based on the total weight of the poly-L-lactide; poly-D-lactide comprising a content of L isomer of at least 10% by weight based on the total weight of the poly-D-lactide; poly-DL-lactide; poly(meso-lactide), or mixture thereof.

According to a third aspect, the present invention also encompasses the use of a composition according to the first aspect of the invention in polymers, membranes, adhesives, foams, sealants, moulded articles, films, extruded articles, fibres, elastomers, polymer based additives, pharmaceutical and biomedical products, varnishes, paints, coatings, inks, composite material, organic LEDs, organic semiconductors, conducting organic polymers, or 3D printed articles.

According to a fourth aspect of the invention encompasses an article comprising a composition according to the first aspect of the invention, or prepared using a process according to the second aspect of the invention.

According to a fifth aspect of the invention encompasses a 3D printed article comprising a composition according to the first aspect of the invention, or prepared using a process according to the second aspect of the invention.

The present invention also encompasses remendable materials comprising a composition according to the first aspect of the invention, or prepared using a process according to the second aspect of the invention. Said materials offer increased durability, safety, and cost efficiency for many applications.

The above and other characteristics, features and advantages of the present invention will become apparent from the following detailed description, taken in conjunction with the accompanying drawings, which illustrate, by way of example, the principles of the invention. The reference figures quoted below refer to the attached drawings.

DETAILED DESCRIPTION OF THE INVENTION

Figure 1:
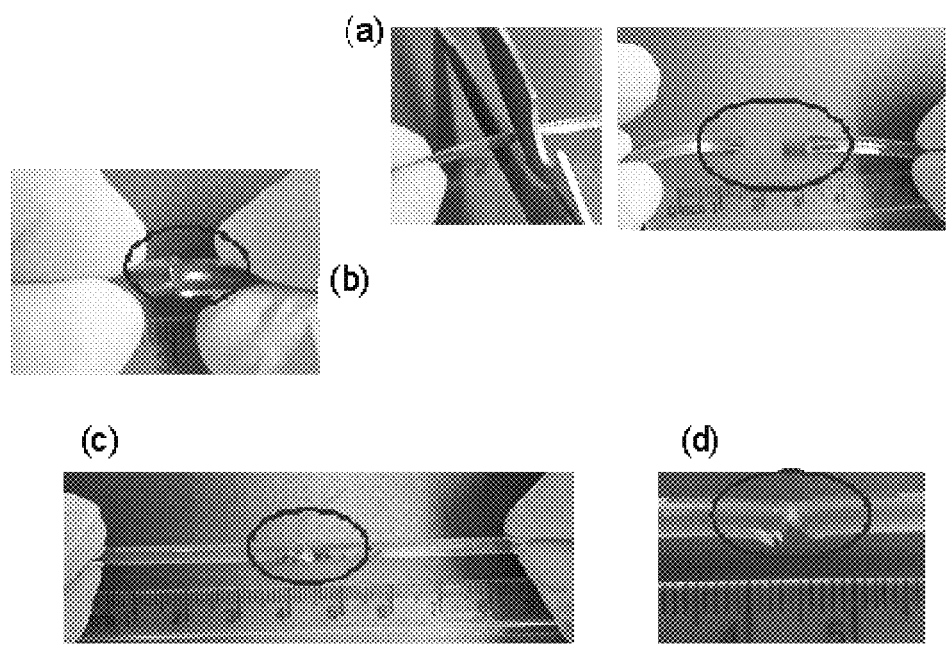
FIG. 1 represents photographs showing a strand made from a composition according to an embodiment of the invention, being cut (a), (b) shows the resulting pieces being pressed against each other. (c) and (d) show the self-healing of the strand.

When describing the invention, the terms used are to be construed in accordance with the following definitions, unless a context dictates otherwise.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

As used in the specification and the appended claims, the singular forms "a", "an," and "the" include plural referents unless the context clearly dictates otherwise. By way of example, "a layer" means one layer or more than one layer.

Unless defined otherwise, all technical and scientific terms used herein have the same meaning as is commonly understood by one of skill in the art. All publications referenced herein are incorporated by reference thereto.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Whenever the term "substituted" is used in the present invention, it is meant to indicate that one or more hydrogens on the atom indicated in the expression using "substituted" is replaced with a selection from the indicated group, provided that the indicated atom's normal valency is not exceeded, and that the substitution results in a chemically stable compound. Where groups can be substituted, such groups may be substituted with one or more, and preferably one, two or three substituents.

The term "alkyl", as a group or part of a group, refers to a hydrocarbyl group of formula $C_nH_{2n+1}$ wherein n is a number of at least 1. Alkyl groups may be linear, or branched and may be substituted as indicated herein. Generally, the alkyl groups comprise from 1 to 20 carbon atoms, preferably from 1 to 12 carbon atoms, preferably from 1 to 10 carbon atoms, preferably from 1 to 8 carbon atoms, preferably from 1 to 6 carbon atoms, more preferably 1, 2, 3, 4, 5, 6 carbon atoms. When a subscript is used herein following a carbon atom, the subscript refers to the number of carbon atoms that the named group may contain. For example, the term "$C_{1-20}$alkyl", as a group or part of a group, refers to a hydrocarbyl group of Formula $C_nH_{2n+1}$ wherein n is a number ranging from 1 to 20. Thus, for example, $C_{1-20}$alkyl groups include all linear, or branched alkyl groups having 1 to 20 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers, heptyl and its isomers, octyl and its isomers, nonyl and its isomers, decyl and its isomers, undecyl and its isomers, dodecyl and its isomers, tridecyl and its isomers, tetradecyl and its isomers, pentadecyl and its isomers, hexadecyl and its isomers, heptadecyl and its isomers, octadecyl and its isomers, nonadecyl and its isomers, icosyl and its isomers, and the like. For example, $C_{1-10}$alkyl includes all linear, or branched alkyl groups having 1 to 10 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers, heptyl and its isomers, octyl and its isomers, nonyl and its isomers, decyl and its isomers and the like. Thus, for example, $C_{1-8}$alkyl groups include all linear, or branched alkyl groups having 1 to 8 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers, heptyl and its isomers, octyl and its isomers, and the like. For example, $C_{1-6}$alkyl includes all linear or branched alkyl groups having 1 to 6 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers, and the like. For example, $C_{1-4}$alkyl includes all linear or branched alkyl groups having 1 to 4 carbon atoms, and thus includes for example methyl, ethyl, n-propyl, i-propyl, 2-methyl-ethyl, butyl and its isomers (e.g. n-butyl, i-butyl and t-butyl), and the like. When the suffix "ene" is used in conjunction with an alkyl group, i.e. "alkylene", this is intended to mean the alkyl group as defined herein having two single bonds as points of attachment to other groups.

Thus, for example, the term "$C_{1-8}$alkylene", as a group or part of a group, refers to $C_{1-8}$alkyl groups that are divalent, i.e., with two single bonds for attachment to two other groups. Alkylene groups may be linear or branched. When the suffix "ene" is used in conjunction with an alkyl group, i.e. "alkylene", this is intended to mean the alkyl group as defined herein having two single bonds as points of attachment to other groups. As used herein, the term "$C_{1-8}$alkylene", by itself or as part of another substituent, refers to $C_{1-8}$alkyl groups that are divalent, i.e., with two single bonds for attachment to two other groups. Alkylene groups may be linear or branched and may be substituted as indicated herein. Non-limiting examples of alkylene groups include methylene ($-CH_2-$), ethylene ($-CH_2-CH_2-$), methyl-methylene ($-CH(CH_3)-$), 1-methyl-ethylene ($-CH(CH_3)-CH_2-$), n-propylene ($-CH_2-CH_2-CH_2-$), 2-methylpropylene ($-CH_2-CH(CH_3)-CH_2-$), 3-methylpropylene ($-CH_2-CH_2-CH(CH_3)-$), n-butylene ($-CH_2-CH_2-CH_2-CH_2-$), 2-methylbutylene ($-CH_2-CH(CH_3)-CH_2-CH_2-$), 4-methylbutylene ($-CH_2-CH_2-CH_2-CH(CH_3)-$), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers.

The term "cycloalkyl", as a group or part of a group, refers to a cyclic alkyl group, that is a monovalent, saturated, hydrocarbyl group having 1 or more cyclic structure, and comprising from 3 to 6 carbon atoms, more preferably from 3 to 9 carbon atoms, more preferably from 3 to 6 carbon atoms, still more preferably from 5 to 6 carbon atoms. Cycloalkyl includes all saturated hydrocarbon groups containing 1 or more rings, including monocyclic or bicyclic groups. The further rings of multi-ring cycloalkyls may be either fused, bridged and/or joined through one or more spiro atoms. When a subscript is used herein following a carbon atom, the subscript refers to the number of carbon atoms that the named group may contain. For example, the term "$C_{3-6}$cycloalkyl", a cyclic alkyl group comprising from 3 to 6 carbon atoms, more preferably from 5 to 6 carbon atoms. Examples of $C_{3-6}$cycloalkyl groups include but are not limited to cyclopropyl, cyclobutyl, cyclopentyl, cyclohexyl. When the suffix "ene" is used in conjunction with a cycloalkyl group, i.e. cycloalkylene, this is intended to mean the cycloalkyl group as defined herein having two single bonds as points of attachment to other groups. Non-limiting examples of "$C_{3-6}$cycloalkylene" include 1,2-cyclopropylene, 1,1-cyclopropylene, 1,1-cyclobutylene, 1,2-cyclobutylene, 1,3-cyclopentylene, 1,1-cyclopentylene, and 1,4-cyclohexylene.

The term "$C_{6-30}aryl$", as a group or part of a group, refers to a polyunsaturated, aromatic hydrocarbyl group having a single ring (i.e. phenyl) or multiple aromatic rings fused together (e.g. naphthalene), or linked covalently, typically containing 6 to 30 atoms; wherein at least one ring is aromatic. The aromatic ring may optionally include one to two additional rings (either cycloalkyl, heterocyclyl or heteroaryl) fused thereto. Examples of suitable aryl include $C_{6-10}aryl$, more preferably $C_{6-8}aryl$. Non-limiting examples of $C_{6-30}aryl$ comprise phenyl, biphenylyl, biphenylenyl, or 1- or 2-naphthanelyl; 5- or 6-tetralinyl, 1-, 2-, 3-, 4-, 5-, 6-, 7- or 8-azulenyl, 4-, 5-, 6 or 7-indenyl, 4- or 5-indanyl, 5-, 6-, 7- or 8-tetrahydronaphthyl, 1,2,3,4-tetrahydronaphthyl, and 1,4-dihydronaphthyl. When the suffix "ene" is used in conjunction with an aryl group, this is intended to mean the aryl group as defined herein having two single bonds as points of attachment to other groups. Suitable arylene groups include 1,4-phenylene, 1,2-phenylene, 1,3-phenylene, biphenylylene, naphthylene, indenylene, and the like.

The term "alkoxy" or "alkyloxy", as a group or part of a group, refers to a group having the Formula —$OR^a$ wherein $R^a$ is alkyl as defined herein above. The term "$C_{1-6}alkoxy$" or "$C_{1-6}alkyloxy$", refers to a group having the Formula —$OR^b$ wherein $R^b$ is $C_{1-6}alkyl$ as defined herein above. Non-limiting examples of suitable $C_{1-6}alkoxy$ include methoxy, ethoxy, propoxy, isopropoxy, butoxy, isobutoxy, sec-butoxy, tert-butoxy, pentyloxy and hexyloxy.

The term "aryloxy", as a group or part of a group, refers to a group having the Formula —$OR^c$ wherein $R^c$ is aryl as defined herein above. The term "$C_{6-10}aryloxy$" refers to a group having the Formula —$OR^d$ wherein $R^d$ is $C_{6-10}aryl$ as defined herein above.

The term "$C_{6-30}arylC_{1-20}alkyl$", as a group or part of a group, means a $C_{1-20}alkyl$ as defined herein, wherein at least one hydrogen atom is replaced by at least one $C_{6-30}aryl$ as defined herein. Non-limiting examples of $C_{6-30}arylC_{1-20}alkyl$ group include benzyl, phenethyl, dibenzylmethyl, methylphenylmethyl, 3-(2-naphthyl)-butyl, and the like.

The term "halo" or "halogen" as a group or part of a group is generic for fluoro, chloro, bromo, iodo.

The term "hydroxyl" or "hydroxy" as used herein refers to the group —OH.

The terms described above and others used in the specification are well understood to those in the art.

Preferred statements (features), and embodiments of the compounds and processes of this invention are now set forth. Each statements and embodiments of the invention so defined may be combined with any other statement and/or embodiments unless clearly indicated to the contrary. In particular, any feature indicated as being preferred or advantageous may be combined with any other feature or features indicated as being preferred or advantageous.

According to the first aspect, a composition is provided comprising:

(a) at least one poly-lactide comprising polymer selected from the group consisting of poly-lactide, poly-lactide-polybutadiene block copolymer, poly-lactide-urethane-polybutadiene block copolymer, poly-lactide-urethane, and mixture thereof; preferably selected from the group consisting of poly-lactide, poly-lactide-polybutadiene block copolymer, poly-lactide-urethane, and mixture thereof; more preferably selected from the group consisting of poly-lactide, poly-lactide-polybutadiene block copolymer, and mixture thereof; more preferably said at least one poly-lactide comprising polymer is poly-lactide; and (b) at least one compound of formula (I),

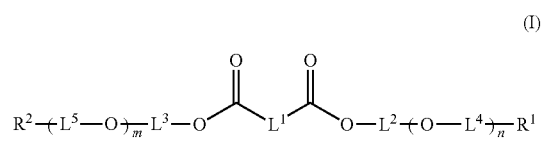

(I)

wherein, $L^1$ is $C_{1-8}alkylene$; or $C_{3-6}cycloalkylene$; each optionally substituted with one or more $C_{1-4}alkyl$; preferably $L^1$ is $C_{1-8}alkylene$; or $C_{3-6}cycloalkylene$; more preferably $L^1$ is $C_{1-8}alkylene$; yet more preferably $L^1$ is $C_{1-6}alkylene$; yet more preferably, $L^1$ is $C_{1-4}alkylene$;

$L^2$ is $C_{1-6}alkylene$; preferably $L^2$ is $C_{1-4}alkylene$; preferably $L^2$ is $C_{1-3}alkylene$; preferably $L^2$ is $C_{1-2}alkylene$;

$L^3$ is $C_{1-6}alkylene$; preferably $L^3$ is $C_{1-4}alkylene$; preferably $L^3$ is $C_{1-3}alkylene$; preferably $L^3$ is $C_{1-2}alkylene$;

$L^4$ is $C_{1-6}alkylene$; preferably $L^4$ is $C_{1-5}alkylene$; preferably $L^4$ is $C_{1-4}alkylene$; preferably $L^4$ is $C_{1-3}alkylene$; preferably $L^4$ is $C_{1-2}alkylene$;

$L^5$ is $C_{1-6}alkylene$; preferably $L^5$ is $C_{1-5}alkylene$; preferably $L^5$ is $C_{1-4}alkylene$; preferably $L^5$ is $C_{1-3}alkylene$; preferably $L^5$ is $C_{1-2}alkylene$;

n is an integer selected from 1, 2, 3 or 4; preferably n is 1, 2 or 3, preferably n is 1 or 2;

m is an integer selected from 1, 2, 3 or 4; preferably m is 1, 2 or 3, preferably m is 1 or 2;

$R^1$ is H; or $C_{1-6}alkyl$; preferably $R^1$ is H; or $C_{1-4}alkyl$; preferably $R^1$ is H; or $C_{1-3}alkyl$; preferably $R^1$ is H; or $C_{1-2}alkyl$;

$R^2$ is H; or $C_{1-6}alkyl$; preferably $R^2$ is H; or $C_{1-4}alkyl$; preferably $R^2$ is H; or $C_{1-3}alkyl$; preferably $R^2$ is H; or $C_{1-2}alkyl$;

wherein the poly-lactide in said poly-lactide comprising polymer is selected from poly-L-lactide comprising a content of D isomer of at least 10% by weight based on the total weight of the poly-L-lactide; poly-D-lactide comprising a content of L isomer of at least 10% by weight based on the total weight of the poly-D-lactide; poly-DL-lactide; poly (meso-lactide), or mixture thereof; preferably the poly-lactide in said poly-lactide comprising polymer is selected from poly-L-lactide comprising a content of D isomer of at least 10% by weight based on the total weight of the poly-L-lactide.

The present composition comprises (a) at least one poly-lactide comprising polymer selected from the group comprising, consisting essentially of, or consisting of poly-lactide, poly-lactide-polybutadiene block copolymer, poly-lactide-urethane-polybutadiene block copolymer, poly-lactide-urethane, and mixture thereof. In an embodiment, the poly-lactide in said poly-lactide comprising polymer is selected from poly-L-lactide (PLLA) comprising a content of D isomer of at least 10% by weight based on the total weight of the poly-L-lactide; poly-D-lactide (PDLA) comprising a content of L isomer of at least 10% by weight based on the total weight of the poly-D-lactide; poly-DL-lactide; poly(meso-lactide), and mixture thereof.

In an embodiment, said at least one polymer (a) is selected from poly-lactide.

As used herein, the terms "polylactic acid" or "polylactide" or "PLA" are used interchangeably and refer to poly(lactic acid) polymers comprising repeat units derived from lactic acid.

Polylactic acid suitable for the composition can be prepared according to any method known in the state of the art. The polylactic acid can be prepared by ring-opening polymerization of raw materials having required structures selected from lactide, which is a cyclic dimer of lactic acid, glycolide, which is a cyclic dimer of glycolic acid, and caprolactone and the like. Lactide includes L-lactide, which is a cyclic dimer of L-lactic acid, D-lactide, which is a cyclic dimer of D-lactic acid, meso-lactide, which is a cyclic dimer of D-lactic acid and L-lactic acid, and DL-lactide, which is a racemate of D-lactide and L-lactide. Random copolymers made from meso-lactide result in an atactic primary structure referred to as poly(meso-lactide) (PmesoLA) and are amorphous. Random optical copolymers made from equimolar amounts of D-lactide and L-lactide are referred to as poly-DL-lactide (PDLLA) or poly(rac-lactide) and are also amorphous. As used herein the term "L-lactide" or "L-L-lactide" refers to (S,S)-lactide and is the cyclic diester of two lactic acid S enantiomers. As used herein the term "D-lactide" or "D-D-lactide" refers to (R,R)-lactide and is a cyclic di-ester of two lactic acid R enantiomers.

The polylactic acid for use in the present composition also includes copolymers of lactic acid. For instance, copolymers of lactic acid and trimethylene carbonate according to EP 11167138 and copolymers of lactic acid and urethanes according to WO 2008/037772 and PCT application number PCT/EP2011/057988. Copolymeric components other than lactic acid may be used and include dicarboxylic acid, polyhydric alcohol, hydroxycarboxylic acid, lactone, or the like, which have two or more functional groups each capable of forming an ester bonding. These are, for example, polyester, polyether, polycarbonate, or the like which have the two or more unreacted functional groups in a molecule. The hydroxycarboxylic acids may be selected from the list comprising glycolic acid, hydroxybutyric acid, hydroxyvaleric acid, hydroxypentanoic acid, hydroxycaproic acid, and hydroxyheptanoic acid. In an embodiment no comonomer is used.

The poly-lactide suitable for the composition preferably comprises amorphous poly-lactide. As used herein, the term "amorphous" refers to a solid that is non-crystalline and lacks the long-range order characteristics of a crystal. For poly-lactide, the polymerization of a racemic mixture of L- and D-lactides usually leads to the synthesis of poly-DL-lactide that is amorphous. When non-racemic mixtures are being polymerized, the degree of crystallinity of the resulting polymer may be controlled by the ratio of D to L enantiomers used and/or the type of catalyst used during the polymerization reaction.

The PLLA (poly-L-lactide) suitable for the invention comprises the product of a co-polymerization reaction of mainly L-lactides (or L,L-lactides) with some D lactide units. The PLLA (poly-L-lactide) suitable for the invention may comprise a content of D isomer of at least 10% by weight based on the total weight of the PLLA. Preferably, the PLLA comprises a content of D isomer of at least 20% by weight based on the total weight of the PLLA. More preferably, the PLLA comprises a content of D isomer of at least 25% by weight based on the total weight of the PLLA. More preferably, the PLLA comprises a content of D isomer of at least 30% by weight based on the total weight of the PLLA.

The PDLA (poly-D-lactide) for use in the present invention may comprise the product of a co-polymerization reaction of mainly D-lactides (or D,D-lactides) with some L lactide units. The PDLA (poly-L-lactide) suitable for the invention may comprise a content of L isomer of at least 10% by weight based on the total weight of the PDLA. Preferably, the PDLA comprises a content of L isomer of at least 20% by weight based on the total weight of the PDLA. More preferably, the PDLA comprises a content of L isomer of at least 25% by weight based on the total weight of the PDLA. More preferably, the PDLA comprises a content of L isomer of at least 30% by weight based on the total weight of the PDLA.

The PDLLA (poly-DL-lactide) for use in the present invention may comprise the product of a polymerization reaction of a racemic mixture of D-lactide and L-lactide. The poly(meso)lactide for use in the present invention may also comprise the product of a polymerization reaction of meso-lactide.

The D/L isomer content of PLA and be measured by different techniques, such as NMR, polarimetry or by enzymatic method. Preferably, the D/L isomer content is measured by enzymatic method and/or NMR, as described for herein below. Enzymatic method: The stereochemical purity of the PLLA or of the PDLA can be determined from the respective content of L-mer or of D-mer. The terms "content of D-mer" and "content of L-mer" refer respectively to the monomer units of type D and of type L that occur in polylactide, using the enzymatic method. The principle of the method is as follows: the L-lactate and D-lactate ions are oxidized to pyruvate respectively by the enzymes L-lactate dehydrogenase and D-lactate dehydrogenase using nicotinamide-adenine dinucleotide (NAD) as coenzyme. To force the reaction in the direction of formation of pyruvate, it is necessary to trap this compound by reaction with hydrazine. The increase in optical density at 340 nm is proportional to the amount of L-lactate or of D-lactate present in the sample. The samples of PLA can be prepared by mixing 25 ml of sodium hydroxide (1 mol/L) with 0.6 g of PLA. The solution was boiled for 8 h and then cooled. The solution was then adjusted to neutral pH by adding hydrochloric acid (1 mol/L), then deionized water was added in a sufficient amount to give 200 ml. The samples were then analyzed on a Vital Scientific Selectra Junior analyzer using, for L-mer determination of poly-L-lactide acid, the box titled "L-lactic acid 5260" marketed by the company SciI and for D-mer determination of poly-D-lactide acid, the box titled "L-lactic acid 5240" marketed by the company SciI. During the analysis, a reactive blank and calibration using the calibrant "SciI 5460" are used. The presence of insertion and racemization defects can also be determined by carbon-13 nuclear magnetic resonance (NMR) (Avance, 400 or 500 MHz, 10 mm SELX probe, or 10 mm cryoprobe). The samples can be prepared from 500 mg of PLA dissolved in 2.5 to 3 ml of $CDCl_3$.

Preferably, the composition comprises:
(a) at least one poly-lactide comprising polymer selected from the group consisting of poly-lactide, poly-lactide-polybutadiene block copolymer, poly-lactide-urethane-polybutadiene block copolymer, poly-lactide-urethane, and mixture thereof; preferably selected from the group consisting of poly-lactide, poly-lactide-polybutadiene block copolymer, poly-lactide-urethane, and mixture thereof; more preferably selected from the group consisting of poly-lactide, poly-lactide-polybutadiene block copolymer, and mixture thereof; more preferably said at least one poly-lactide comprising polymer is poly-lactide; and (b) at least one compound of formula (I), wherein, $L^1$ is $C_{1-8}$alkylene; or $C_{3-6}$cycloalkylene; each optionally substituted with one or more $C_{1-4}$alkyl; preferably $L^1$ is $C_{1-8}$alkylene; or $C_{3-6}$cycloalkylene; more preferably $L^1$ is $C_{1-8}$alkylene; yet more preferably $L^1$ is $C_{1-6}$alkylene; yet more preferably, $L^1$ is $C_{1-4}$alkylene; $L^2$ is $C_{1-6}$alkylene; preferably $L^2$ is $C_{1-4}$alkylene; preferably $L^2$ is $C_{1-3}$alkylene; preferably $L^2$ is $C_{1-2}$alkylene; $L^3$ is $C_{1-6}$alkylene; preferably $L^3$ is $C_{1-4}$alkylene; preferably $L^3$ is $C_{1-3}$alkylene; preferably $L^3$ is $C_{1-2}$alkylene; $L^4$ is $C_{1-6}$alkylene; preferably $L^4$ is $C_{1-5}$alkylene; preferably $L^4$ is $C_{1-4}$alkylene; preferably $L^4$ is $C_{1-3}$alkylene; preferably $L^4$ is $C_{1-2}$alkylene; $L^5$ is $C_{1-6}$alkylene; preferably $L^5$ is $C_{1-5}$alkylene; preferably $L^5$ is $C_{1-4}$alkylene; preferably $L^5$ is $C_{1-3}$alkylene; preferably $L^5$ is $C_{1-2}$alkylene; n is an integer selected from 1, 2, 3 or 4; preferably n is 1, 2 or 3, preferably n is 1 or 2; m is an integer selected from 1, 2, 3 or 4; preferably m is 1, 2 or 3, preferably m is 1 or 2; $R^1$ is H; or $C_{1-6}$alkyl; preferably $R^1$ is H; or $C_{1-4}$alkyl; preferably $R^1$ is H; or $C_{1-3}$alkyl; preferably $R^1$ is H; or $C_{1-2}$alkyl; $R^2$ is H; or $C_{1-6}$alkyl; preferably $R^2$ is H; or $C_{1-4}$alkyl; preferably $R^2$ is H; or $C_{1-3}$alkyl; preferably $R^2$ is H; or $C_{1-2}$alkyl;

wherein the poly-lactide in said poly-lactide comprising polymer is selected from poly-L-lactide comprising a content of D isomer of at least 20% by weight based on the total weight of the poly-L-lactide; poly-D-lactide comprising a content of L isomer of at least 20% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 20% by weight based on the total weight of the poly-L-lactide. More preferably, the poly-lactide in said poly-lactide comprising polymer is selected from poly-L-lactide comprising a content of D isomer of at least 25% by weight based on the total weight of the poly-L-lactide; poly-D-lactide comprising a content of L isomer of at least 25% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 25% by weight based on the total weight of the poly-L-lactide. Yet more preferably, the poly-lactide in said poly-lactide comprising polymer is selected from poly-L-lactide comprising a content of D isomer of at least 28% by weight based on the total weight of the poly-L-lactide; poly-D-lactide comprising a content of L isomer of at least 28% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 28% by weight based on the total weight of the poly-L-lactide. Yet more preferably, the poly-lactide in said poly-lactide comprising polymer is selected from poly-L-lactide comprising a content of D isomer of at least 29% by weight based on the total weight of the poly-L-lactide; poly-D-lactide comprising a content of L isomer of at least 29% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 29% by weight based on the total weight of the poly-L-lactide.

In a preferred embodiment, the poly-lactide suitable for the invention has a weight average molecular weight (Mw) of at least 40 kDa, preferably at least 100 kDa, for example at least 150 kDa, for example at least 200 kDa, for example at least 250 kDa, for example at least 260 kDa. Measurement of the molecular masses may be performed at 25° C. using a liquid chromatograph WATERS 610. Firstly, a polymer solution is prepared in chloroform (1 mg polymer/ml). Then, 100 μl of this solution is taken and injected, through a filter (with pores of 0.2 μm diameter, on the chromatograph column at 25° C. Molecular masses are determined from the retention time in the column, translated in mass equivalent using a universal calibration law based on polystyrene standards. For example, ASTM practice D3016-97(2010) may be used. In an embodiment, the ratio of the weight average molecular weight (Mw) to the number average molecular weight (Mn) is generally from 1.0 to 5.0, for example from 1.0 to 3.0, preferably from 1.0 to 2.6.

Preferably, the poly-lactide (PLLA, PDLA, PmesoLA or PDLLA) suitable for the invention, has a number average molecular weight (Mn) ranging from 40000 to 350000 g/mol, more preferably from 50000 to 175000 g/mol, even more preferably from 60000 to 150000 g/mol, for example from 60000 to 100000 g/mol. The weight average and number average molecular weight were measured by chromatography by gel permeation compared to a standard polystyrene in chloroform at 25° C.

In an embodiment, the poly-lactide (PLLA, PDLA, PmesoLA or PDLLA) may have a density of from 1.228 g/cm³ to 1.269 g/cm³, for example from 1.230 g/cm³ to 1.260 g/cm³, for example from 1.235 g/cm³ to 1.255 g/cm³ as determined in accordance with ASTM D792.

Poly-lactide suitable for use in the invention can be prepared using a process comprising the step of contacting at least one L-lactide, D-lactide, and/or meso-lactide with a suitable catalyst, and optionally in the presence of a co-initiator. The process may be performed with or without solvent.

The catalyst employed for this process may have general formula $M(Y^1, Y^2, \ldots Y^p)_q$, in which M is a metal selected from the group comprising the elements of columns 3 to 12 of the periodic table of the elements, as well as the elements Al, Ga, In, Tl, Ge, Sn, Pb, Sb, Ca, Mg and Bi; whereas $Y^1, Y^2, \ldots Y^p$ are each substituents selected from the group comprising alkyl with 1 to 20 carbon atoms, aryl having from 6 to 30 carbon atoms, alkoxy having from 1 to 20 carbon atoms, aryloxy having from 6 to 30 carbon atoms, and other oxide, carboxylate, and halide groups as well as elements of group 15 and/or 16 of the periodic table; p and q are integers of from 1 to 6. As examples of suitable catalysts, we may notably mention the catalysts of Sn, Ti, Zr, Zn, and Bi; preferably an alkoxide or a carboxylate and more preferably $Sn(Oct)_2$, $Ti(OiPr)_4$, $Ti(2-ethylhexanoate)_4$, $Ti(2-ethylhexyloxide)_4$, $Zr(OiPr)_4$, $Bi(neodecanoate)_3$, (2,4-di-tert-butyl-6-(((2-(dimethylamino)ethyl)(methyl)amino)methyl)phenoxy)(ethoxy)zinc, or $Zn(lactate)_2$.

In an embodiment, the poly-lactide can be obtained by polymerizing L-lactide, D-lactide and/or meso-lactide, respectively, preferably in the presence of a co-initiator of formula (A), $$R^{10}\text{—OH} \qquad (A)$$

wherein $R^{10}$ is selected from the group consisting of $C_{1-20}$alkyl, $C_{6-30}$aryl, and $C_{6-30}$aryl$C_{1-20}$alkyl optionally substituted by one or more substituents selected from the group consisting of halogen, hydroxyl, and $C_{1-6}$alkyl. Preferably, $R^{10}$ is selected from $C_{3-12}$alkyl, $C_{6-10}$aryl, and $C_{6-10}$aryl$C_{3-12}$alkyl, optionally substituted by one or more substituents, each independently selected from the group consisting of halogen, hydroxyl, and $C_{1-6}$alkyl; preferably, $R^{10}$ is selected from $C_{3-12}$alkyl, $C_{6-10}$aryl, and $C_{6-10}$aryl$C_{3-12}$alkyl, optionally substituted by one or more substituents, each independently selected from the group consisting of halogen, hydroxyl and $C_{1-4}$alkyl. The initiator can be an alcohol. The alcohol can be a polyol such as diol, triol or higher functionality polyhydric alcohol. The alcohol may be derived from biomass such as for instance glycerol or propanediol or any other sugar-based alcohol such as for example erythritol. The alcohol can be used alone or in combination with another alcohol.

In an embodiment, non-limiting examples of initiators include 1-octanol, isopropanol, propanediol, trimethylolpropane, 2-butanol, 3-buten-2-ol, 1,3-butanediol, 1,4-butanediol, 1,6-hexanediol, 1,7-heptanediol, benzyl alcohol, 4-bromophenol,1,4-benzenedimethanol, and (4-trifluoromethyl) benzyl alcohol; preferably, said compound of formula (i) is selected from 1-octanol, isopropanol, and 1,4-butanediol.

The polymerization can be performed at a temperature of 60° C.-200° C. The temperature is preferably that of the reaction itself. According to an embodiment, without solvent, the polymerization can be performed at a temperature of 110° C.-190° C. in bulk.

In an embodiment, said at least one polymer (a) is selected from poly-lactide-polybutadiene block copolymer and poly-lactide-urethane-polybutadiene block copolymer.

Suitable block copolymer comprises polymer comprising multiple sequences, or blocks, of the same monomer alternating in series with different monomer blocks; these blocks are covalently bound to each other. Block copolymers are normally prepared by controlled polymerization of one monomer, followed by chain extension with a different monomer. Block copolymers are classified based on the number of blocks they contain and how the blocks are arranged. For example, block copolymers with two blocks are called diblocks; those with three blocks are triblocks; and those with more than three are generically called multiblocks. Classifications by arrangement include the linear, or end-to-end, arrangement and the star arrangement, in which one polymer is the base for multiple branches.

In an embodiment, said block copolymer is selected from diblock copolymer, triblock copolymer, multiblock copolymer, star copolymers, comb copolymers, gradient containing block copolymers, and other copolymers having a blocky structure, which will be known by those skilled in the art. Preferred are diblock and triblock copolymers. An example of a gradient containing block copolymer is when the monomer or monomers used from one segment are allowed to further react as a minor component in the next sequential segment. For example, if the monomer mix used for the 1st block (A block) of an AB diblock copolymer is polymerized to only 80% conversion, then the remaining 20% of the unreacted monomer is allowed to react with the new monomers added for the B block segment, the result is an AB diblock copolymer in which the B segment contains a gradient of the A segment composition. The term "comb copolymer," as used herein, describes a type of graft copolymer, wherein the polymeric backbone of the graft copolymer is linear or essentially linear and is made of one polymer A, and each side chain (graft segment) of the graft copolymer is formed by a polymer B that is grafted to the polymer A backbone. Used herein, the terms "comb copolymer" and "graft copolymer" have the same meaning.

In an embodiment, said poly-lactide-polybutadiene (PLA-PB) block copolymer is selected from the group comprising PLA-PB diblock copolymer, PLA-PB-PLA triblock copolymer, PLA-PB multiblock copolymer, PLA-PB star copolymers, PLA-PB comb copolymers, and PLA-PB gradient containing block copolymers. Preferable diblock and triblock copolymers include PLA-PB and PLA-PB-PLA block copolymers.

Preferably, the poly-lactide in said poly-lactide-polybutadiene block copolymer is selected from poly-L-lactide comprising a content of D isomer of at least 10% by weight based on the total weight of the poly-L-lactide in said block copolymer; poly-D-lactide comprising a content of L isomer of at least 10% by weight based on the total weight of the poly-D-lactide in said block copolymer; poly-DL-lactide; poly(meso-lactide), and mixture thereof.

Preferably, the poly-lactide in said poly-lactide-urethane-polybutadiene block copolymer is selected from poly-L-lactide comprising a content of D isomer of at least 10% by weight based on the total weight of the poly-L-lactide in said block copolymer; poly-D-lactide comprising a content of L isomer of at least 10% by weight based on the total weight of the poly-D-lactide in said block copolymer; poly-DL-lactide; poly(meso-lactide), and mixture thereof.

In an embodiment, the poly-lactide-polybutadiene block copolymer can be produced by combining an L-lactide, a D-lactide and/or a meso-lactide, with a polybutadiene, preferably a hydroxy functionalized polybutadiene. In one or more embodiments, the block copolymer is produced by melt blending L-lactide, a D-lactide and/or a meso-lactide and a hydroxy functionalized polybutadiene. Such processes may utilize catalysts for polylactic acid formation, such as tin compounds (e.g., tin octylate), titanium compounds (e.g., tetraisopropyl titanate), zirconium compounds (e.g., zirconium isopropoxide), antimony compounds (e.g., antimony trioxide) or combinations thereof, for example.

Among the hydroxyl-terminated polybutadienes that are useful for preparing the block copolymers are those possessing a number average molecular weight (Mn) of at least 1000 g/mol, for example at least 5000 g/mol, preferably at least 10000 g/mol. In some embodiments the hydroxyl-terminated polybutadienes possess a Mn ranging from 1000 to 20000 g/mol, for example from 5000 to 25000 g/mol, and advantageously from 8000 to 20000 g/mol, and advantageously from 9000 to 20000 g/mol, and advantageously from 10000 to 20000 g/mol.

Among the hydroxyl-terminated polybutadienes that are useful for preparing the block copolymers are those possessing a hydroxyl group content of from 0.10 to 3.0 Mmol/g.

Hydroxyl-terminated polybutadienes of the above-described type, averaging more than one predominantly primary hydroxyl group per molecule, e.g., averaging from 1.5 to 3 or more primary hydroxyl groups per molecule, can be suitably employed herein. Branched hydroxyl-terminated polybutadienes can possess an average of at least 1.90, and advantageously from 1.95 up to 2.8, hydroxyl groups per molecule, the hydroxyl groups being predominantly in terminal positions on the main, i.e., the terminal hydroxyl groups of the polymer, are bonded to carbon atoms adjacent to double bonded carbon atoms.

The useful hydroxyl-terminated polybutadienes herein can also incorporate one or more other copolymerizable monomers that can confer particularly desirable properties upon the copolymers herein and the compositions prepared therewith. Included among the copolymerizable monomers are mono-olefins and dienes such as ethylene, propylene, 1-butene, isoprene, chloroprene, 2,3-methyl-1,3-butadiene, 1,4-pentadiene, etc., and, ethylenically unsaturated monomers such as acrylonitrile, methacrylonitrile, methylstyrene, methyl acrylate, methyl methacrylate, vinyl acetate, isocyanate etc. Alternatively or in addition thereto, the hydroxyl-terminated polybutadienes can be reacted with one or more other monomers to provide hydroxyl-terminated block copolymers. Such monomers include 1,2-epoxides such as ethylene oxide and propylene oxide which will provide polyether segments, e-caprolactone which will provide polyester segments, and the like.

Hydroxyl-terminated polybutadienes possessing these characteristics are commercially available from several sources and are therefore conveniently employed herein.

Examples of suitable hydroxyl-terminated polybutadiene include but are not limited to Krasol® LBH 10000, Krasol® LBH 2000, Krasol® LBH 3000 and Krasol® LBH 5000, Krasol® LBH-P 2000, Krasol® LBH-P 3000, Krasol® LBH-P 5000, Poly Bd® R45HTLO, Poly Bd® R20LM commercially available from HSC Cray Valley Corp., as well as the epoxidized hydroxyl-terminated polybutadiene such as Poly bd® 605 and Poly bd® 600 commercially available from HSC Cray Valley Corp.

In an embodiment, said block copolymer comprises at least 10% by weight of hydroxyl functionalized polybutadiene based on the total weight of the block copolymer. In an embodiment, said block copolymer comprises from 10% to 90% by weight of hydroxyl functionalized polybutadiene based on the total weight of the block copolymer.

Poly-lactide-urethane-polybutadiene block copolymer can be prepared by contacting an L-lactide, D-lactide and/or meso-lactide, with a polybutadiene, preferably a hydroxy functionalized polybutadiene, thereby obtaining polylactide-polybutadiene block copolymer, and contacting said block copolymer with a diisocyanate compound and optionally a diamine or a dialcohol to form a poly-lactide-urethane-polybutadiene block copolymer. The dihydroxyl alcohol or diamine can be used as initiator.

Non-limiting examples of suitable diamine initiators include 1,4-diaminobutane, 1,6-diaminohexane, 1,4-diaminocyclohexane, 1,4-diaminophenyl, 4,4'-diaminodiphenylmethane. Preferably, the 1,4-diaminophenyl, 4,4'-diaminodiphenylmethane is used.

The following alcohols can be used as initiator: 1,3-propanediol, 1,3-butanediol, 1,4-butanediol, 1,6-hexanediol, 1,7-heptanediol, 1,8-octanediol, xylene glycol.

Suitable diisocyanate compounds include compounds of formula: $O=C=N-L^x-N=C=O$ wherein $L^x$ can be aliphatic or aromatic. Preferably $L^x$ is selected from the group comprising $C_{4-20}$alkylene, $C_{4-6}$cycloalkylene, $C_{6-12}$arylene, $C_{6-12}$arylene-$C_{6-12}$arylene, $C_{6-12}$arylene$C_{1-6}$alkylene $C_{6-12}$arylene, $C_{4-6}$cycloalkylene$C_{1-6}$alkylene$C_{4-6}$cycloalkylene; each group being optionally substituted. For example $L^x$ can be hexamethylene, dicyclohexylmethane, diphenylmethane and the like.

Non-limiting examples of suitable diisocyanates which may be used include aliphatic isocyanates such as hexamethylene diisocyanate; and aromatic isocyanates such as diphenylmethane diisocyanate (MDI) in the form of its 2,4', 2,2' and 4,4' isomers and mixtures thereof, the mixtures of diphenylmethane diisocyanates (MDI) and oligomers thereof, m- and p-phenylene diisocyanate, tolylene-2,4- and tolylene-2,6-diisocyanate (also known as toluene diisocyanate) in any suitable isomer mixture, chlorophenylene-2,4-diisocyanate, naphthylene-1,5-diisocyanate, diphenylene-4, 4'-diisocyanate, 4,4'-diisocyanate-3,3'-dimethyl-diphenyl, 3-methyl-diphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane (e.g. 4,4'-diisocyanatodicyclohexylmethane (H12MDI)), isophorone diisocyanate (IPDI), butylene diisocyanate, trimethylhexamethylene diisocyanate, isocyanatomethyl-1,8-octane diisocyanate, tetramethylxylene diisocyanate (TMXDI), 1,4-cyclohexane-diisocyanate (CDI), and tolidine diisocyanate (TODI); any mixture thereof.

In an embodiment, the at least one polymer (a) can be poly-lactide-urethane. Non-limiting examples of suitable poly-lactide-urethanes are described in WO2010/133419 hereby incorporated by reference.

Preferably, a composition is provided comprising (a) at least one poly-lactide comprising polymer selected from the group comprising, consisting essentially of, or consisting of poly-lactide, poly-lactide-polybutadiene block copolymer, poly-lactide-urethane-polybutadiene block copolymer, poly-lactide-urethane, and mixture thereof, wherein, the poly-lactide in said poly-lactide comprising polymer is selected from poly-L-lactide comprising a content of D isomer of at least 10%, by weight, preferably at least 15% by weight based on the total weight of the poly-L-lactide; poly-D-lactide comprising a content of L isomer of at least 15% by weight based on the total weight of the poly-D-lactide; poly-DL-lactide; poly(meso-lactide), and mixture thereof; preferably wherein, the poly-lactide in said poly-lactide comprising polymer is selected from poly-L-lactide comprising a content of D isomer of at least 20% by weight based on the total weight of the poly-L-lactide; poly-D-lactide comprising a content of L isomer of at least 20% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 20% by weight based on the total weight of the poly-L-lactide; poly-D-lactide comprising a content of L isomer of at least 20% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 25% by weight based on the total weight of the poly-L-lactide; poly-D-lactide comprising a content of L isomer of at least 25% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 30% by weight based on the total weight of the poly-L-lactide; poly-D-lactide comprising a content of L isomer of at least 30% by weight based on the total weight of the poly-D-lactide; poly-DL-lactide; poly(meso-lactide), and mixture thereof.

The composition may comprise at least 40% by weight of said poly-lactide comprising polymer based on the total weight of the composition; for example at least 50% by weight, for example at least 55% by weight, for example at least 60% by weight based on the total weight of the composition. In some embodiments, the composition may comprise at least 65% by weight of the at least one polymer (a) based on the total weight of the composition; for example at least 68% by weight, for example from 40% to 90% by weight, for example from 50% to 90% by weight, for example from 60% to 90% by weight, for example from 65% to 80% by weight of said at least one polymer (a) based on the total weight of the composition.

Preferably, the composition comprises:

(a) at least 40% by weight of said poly-lactide comprising polymer based on the total weight of the composition; wherein said poly-lactide comprising polymer is selected from the group consisting of poly-lactide, poly-lactide-polybutadiene block copolymer, poly-lactide-urethane-polybutadiene block copolymer, poly-lactide-urethane, and mixture thereof; preferably selected from the group consisting of poly-lactide, poly-lactide-polybutadiene block copolymer, poly-lactide-urethane, and mixture thereof; more preferably selected from the group consisting of poly-lactide, poly-lactide-polybutadiene block copolymer, and mixture thereof; more preferably said at least one poly-lactide comprising polymer is poly-lactide; and (b) at least one compound of formula (I) wherein, $L^1$ is $C_{1-8}$alkylene; or $C_{3-6}$cycloalkylene; each optionally substituted with one or more $C_{1-4}$alkyl; preferably $L^1$ is $C_{1-8}$alkylene; or $C_{3-6}$cycloalkylene; more preferably $L^1$ is $C_{1-8}$alkylene; yet more preferably $L^1$ is $C_{1-6}$alkylene; yet more preferably, $L^1$ is $C_{1-4}$alkylene; $L^2$ is $C_{1-6}$alkylene; preferably $L^2$ is $C_{1-4}$alkylene; preferably $L^2$ is $C_{1-3}$alkylene; preferably $L^2$ is $C_{1-2}$alkylene; $L^3$ is $C_{1-6}$alkylene; preferably $L^3$ is $C_{1-4}$alkylene; preferably $L^3$ is $C_{1-3}$alkylene; preferably $L^3$ is $C_{1-2}$alkylene; $L^4$ is $C_{1-6}$alkylene; preferably $L^4$ is $C_{1-5}$alkylene; preferably $L^4$ is $C_{1-4}$alkylene; preferably $L^4$ is $C_{1-3}$alkylene; preferably $L^4$ is $C_{1-2}$alkylene; $L^5$ is $C_{1-6}$alkylene; preferably $L^5$ is $C_{1-5}$alkylene; preferably $L^5$ is $C_{1-4}$alkylene; preferably $L^5$ is $C_{1-3}$alkylene; preferably $L^5$ is $C_{1-2}$alkylene; n is an integer selected from 1, 2, 3 or 4; preferably n is 1, 2 or 3, preferably n is 1 or 2; m is an integer selected from 1, 2, 3 or 4; preferably m is 1, 2 or 3, preferably m is 1 or 2; $R^1$ is H; or $C_{1-6}$alkyl; preferably $R^1$ is H; or $C_{1-4}$alkyl; preferably $R^1$ is H; or $C_{1-3}$alkyl; preferably $R^1$ is H; or $C_{1-2}$alkyl; $R^2$ is H; or $C_{1-6}$alkyl; preferably $R^2$ is H; or $C_{1-4}$alkyl; preferably $R^2$ is H; or $C_{1-3}$alkyl; preferably $R^2$ is H; or $C_{1-2}$alkyl;

wherein the poly-lactide in said poly-lactide comprising polymer is selected from poly-L-lactide comprising a content of D isomer of at least 20% by weight based on the total weight of the poly-L-lactide; poly-D-lactide comprising a content of L isomer of at least 20% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 20% by weight based on the total weight of the poly-L-lactide. More preferably, the poly-lactide in said poly-lactide comprising polymer is selected from poly-L-lactide comprising a content of D isomer of at least 25% by weight based on the total weight of the poly-L-lactide; poly-D-lactide comprising a content of L isomer of at least 25% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 25% by weight based on the total weight of the poly-L-lactide. Yet more preferably, the poly-lactide in said poly-lactide comprising polymer is selected from poly-L-lactide comprising a content of D isomer of at least 28% by weight based on the total weight of the poly-L-lactide; poly-D-lactide comprising a content of L isomer of at least 28% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 28% by weight based on the total weight of the poly-L-lactide. Yet more preferably, the poly-lactide in said poly-lactide comprising polymer is selected from poly-L-lactide comprising a content of D isomer of at least 29% by weight based on the total weight of the poly-L-lactide; poly-D-lactide comprising a content of L isomer of at least 29% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 29% by weight based on the total weight of the poly-L-lactide.

Preferably, the composition may comprise at least 40% by weight of said poly-lactide comprising polymer based on the total weight of the composition; for example at least 50% by weight, for example at least 55% by weight, for example at least 60% by weight based on the total weight of the composition, wherein said poly-lactide comprising polymer is selected from the group comprising, consisting essentially of, or consisting of poly-lactide, poly-lactide-polybutadiene block copolymer, poly-lactide-urethane-polybutadiene block copolymer, poly-lactide-urethane, and mixture thereof, wherein, the poly-lactide in said poly-lactide comprising polymer is selected from poly-L-lactide comprising a content of D isomer of at least 10% by weight based on the total weight of the poly-L-lactide; poly-D-lactide comprising a content of L isomer of at least 10% by weight based on the total weight of the poly-D-lactide; poly-DL-lactide; poly(meso-lactide), and mixture thereof; preferably wherein, the poly-lactide in said poly-lactide comprising polymer is selected from poly-L-lactide comprising a content of D isomer of at least 15% by weight based on the total weight of the poly-L-lactide; poly-D-lactide comprising a content of L isomer of at least 15% by weight based on the total weight of the poly-D-lactide; poly-DL-lactide; poly(meso-lactide), and mixture thereof; preferably wherein, the poly-lactide in said poly-lactide comprising polymer is selected from poly-L-lactide comprising a content of D isomer of at least 20% by weight based on the total weight of the poly-L-lactide; poly-D-lactide comprising a content of L isomer of at least 20% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 25% by weight based on the total weight of the poly-L-lactide; poly-D-lactide comprising a content of L isomer of at least 25% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 30% by weight based on the total weight of the poly-L-lactide; poly-D-lactide comprising a content of L isomer of at least 30% by weight based on the total weight of the poly-D-lactide; poly-DL-lactide; poly(meso-lactide), and mixture thereof.

Preferably, the composition may comprise at least 40% by weight based on the total weight of the composition of said poly-lactide comprising polymer, wherein said poly-lactide comprising polymer is poly-lactide, for example wherein said composition comprises at least 50% by weight, for example at least 55% by weight, for example at least 60% by weight of poly-lactide based on the total weight of the composition, wherein, the poly-lactide is poly-L-lactide comprising a content of D isomer of at least 10% by weight based on the total weight of the poly-L-lactide; or poly-D-lactide comprising a content of L isomer of at least 10% by weight based on the total weight of the poly-D-lactide; or poly-DL-lactide; or poly(meso-lactide), and mixture thereof; preferably wherein, the poly-lactide is poly-L-lactide comprising a content of D isomer of at least 15% by weight based on the total weight of the poly-L-lactide; or poly-D-lactide comprising a content of L isomer of at least 15% by weight based on the total weight of the poly-D-lactide; or poly-DL-lactide; or poly(meso-lactide), and mixture thereof; preferably wherein, the poly-lactide is poly-L-lactide comprising a content of D isomer of at least 20% by weight based on the total weight of the poly-L-lactide; or poly-D-lactide comprising a content of L isomer of at least 20% by weight based on the total weight of the poly-D-lactide; or poly-DL-lactide; or poly(meso-lactide), and mixture thereof; preferably the poly-lactide is poly-L-lactide comprising a content of D isomer of at least 25% by weight based on the total weight of the poly-L-lactide; or poly-D-lactide comprising a content of L isomer of at least 25% by weight based on the total weight of the poly-D-lactide; or poly-DL-lactide; or poly(meso-lactide), and mixture thereof; preferably the poly-lactide is poly-L-lactide comprising a content of D isomer of at least 30% by weight based on the total weight of the poly-L-lactide; or poly-D-lactide comprising a content of L isomer of at least 30% by weight based on the total weight of the poly-D-lactide; or poly-DL-lactide; or poly(meso-lactide), and mixture thereof.

Preferably, the composition may comprise at least 40% by weight based on the total weight of the composition of said poly-L-lactide comprising polymer, for example wherein said composition comprises at least 50% by weight, for example at least 55% by weight, for example at least 60% by weight of poly-L-lactide based on the total weight of the composition, wherein, the poly-L-lactide comprises a content of D isomer of at least 10% by weight based on the total weight of the poly-L-lactide; preferably at least 15% by weight based on the total weight of the poly-L-lactide; preferably at least 20% by weight based on the total weight of the poly-L-lactide; preferably of at least 25% by weight based on the total weight of the poly-L-lactide; preferably at least 30% by weight based on the total weight of the poly-L-lactide.

The present composition also comprises (b) at least one compound of formula (I), wherein, $L^1$ is $C_{1-8}$alkylene; or $C_{3-6}$cycloalkylene; each optionally substituted with one or more $C_{1-4}$alkyl; preferably $L^1$ is $C_{1-8}$alkylene; or $C_{3-6}$cycloalkylene; more preferably $L^1$ is $C_{1-8}$alkylene; yet more preferably $L^1$ is $C_{1-6}$alkylene; yet more preferably, $L^1$ is $C_{1-4}$alkylene;

$L^2$ is $C_{1-6}$alkylene; preferably $L^2$ is $C_{1-4}$alkylene; preferably $L^2$ is $C_{1-3}$alkylene; preferably $L^2$ is $C_{1-2}$alkylene;

$L^3$ is $C_{1-6}$alkylene; preferably $L^3$ is $C_{1-4}$alkylene; preferably $L^3$ is $C_{1-3}$alkylene; preferably $L^3$ is $C_{1-2}$alkylene;

$L^4$ is $C_{1-6}$alkylene; preferably $L^4$ is $C_{1-5}$alkylene; preferably $L^4$ is $C_{1-4}$alkylene; preferably $L^4$ is $C_{1-3}$alkylene; preferably $L^4$ is $C_{1-2}$alkylene;

$L^5$ is $C_{1-6}$alkylene; preferably $L^5$ is $C_{1-5}$alkylene; preferably $L^5$ is $C_{1-4}$alkylene; preferably $L^5$ is $C_{1-3}$alkylene; preferably $L^5$ is $C_{1-2}$alkylene;

n is an integer selected from 1, 2, 3 or 4; preferably n is 1, 2 or 3, preferably n is 1 or 2;

m is an integer selected from 1, 2, 3 or 4; preferably m is 1, 2 or 3, preferably m is 1 or 2;

$R^1$ is H; or $C_{1-6}$alkyl; preferably $R^1$ is H; or $C_{1-4}$alkyl; preferably $R^1$ is H; or $C_{1-3}$alkyl; preferably $R^1$ is H; or $C_{1-2}$alkyl; and $R^2$ is H; or $C_{1-6}$alkyl; preferably $R^2$ is H; or $C_{1-4}$alkyl; preferably $R^2$ is H; or $C_{1-3}$alkyl; preferably $R^2$ is H; or $C_{1-2}$alkyl.

In an embodiment, the composition according to any of the embodiments described herein comprises (b) at least one compound of formula (I), wherein $L^1$ is $C_{1-6}$alkylene.

In an embodiment, the composition according to any of the embodiments described herein comprises (b) at least one compound of formula (I), wherein $L^1$ is $C_{1-8}$alkylene; or $C_{3-6}$cycloalkylene; more preferably $L^1$ is $C_{1-8}$alkylene; yet more preferably $L^1$ is $C_{1-6}$alkylene; yet more preferably, $L^1$ is $C_{1-4}$alkylene; $L^2$ is $C_{1-6}$alkylene; preferably $L^2$ is $C_{1-4}$alkylene; preferably $L^2$ is $C_{1-3}$alkylene; preferably $L^2$ is $C_{1-2}$alkylene; $L^3$ is $C_{1-6}$alkylene; preferably $L^3$ is $C_{1-4}$alkylene; preferably $L^3$ is $C_{1-3}$alkylene; preferably $L^3$ is $C_{1-2}$alkylene; $L^4$ is $C_{1-6}$alkylene; preferably $L^4$ is $C_{1-5}$alkylene; preferably $L^4$ is $C_{1-4}$alkylene; preferably $L^4$ is $C_{1-3}$alkylene; preferably $L^4$ is $C_{1-2}$alkylene; $L^5$ is $C_{1-6}$alkylene; preferably $L^5$ is $C_{1-5}$alkylene; preferably $L^5$ is $C_{1-4}$alkylene; preferably $L^5$ is $C_{1-3}$alkylene; preferably $L^5$ is $C_{1-2}$alkylene; n is an integer selected from 1, 2, 3 or 4; preferably n is 1, 2 or 3, preferably n is 1 or 2; m is an integer selected from 1, 2, 3 or 4; preferably m is 1, 2 or 3, preferably m is 1 or 2; $R^1$ is H; or $C_{1-6}$alkyl; preferably $R^1$ is H; or $C_{1-4}$alkyl; preferably $R^1$ is H; or $C_{1-3}$alkyl; preferably $R^1$ is H; or $C_{1-2}$alkyl; and $R^2$ is H; or $C_{1-6}$alkyl; preferably $R^2$ is H; or $C_{1-4}$alkyl; preferably $R^2$ is H; or $C_{1-3}$alkyl; preferably $R^2$ is H; or $C_{1-2}$alkyl.

In an embodiment, the composition according to any of the embodiments described herein comprises (b) at least one compound of formula (I), wherein $L^1$ is $C_{1-8}$alkylene; yet more preferably $L^1$ is $C_{1-6}$alkylene; yet more preferably, $L^1$ is $C_{1-4}$alkylene; $L^2$ is $C_{1-4}$alkylene; preferably $L^2$ is $C_{1-3}$alkylene; preferably $L^2$ is $C_{1-2}$alkylene; $L^3$ is $C_{1-4}$alkylene; preferably $L^3$ is $C_{1-3}$alkylene; preferably $L^3$ is $C_{1-2}$alkylene; $L^4$ is $C_{1-5}$alkylene; preferably $L^4$ is $C_{1-4}$alkylene; preferably $L^4$ is $C_{1-3}$alkylene; preferably $L^4$ is $C_{1-2}$alkylene; $L^5$ is $C_{1-5}$alkylene; preferably $L^5$ is $C_{1-4}$alkylene; preferably $L^5$ is $C_{1-3}$alkylene; preferably $L^5$ is $C_{1-2}$alkylene; n is an integer selected from 1, 2, 3; preferably n is 1 or 2; m is an integer selected from 1, 2 or 3, preferably m is 1 or 2; $R^1$ is H; or $C_{1-4}$alkyl; preferably $R^1$ is H; or $C_{1-3}$alkyl; preferably $R^1$ is H; or $C_{1-2}$alkyl; and $R^2$ is H; or $C_{1-4}$alkyl; preferably $R^2$ is H; or $C_{1-3}$alkyl; preferably $R^2$ is H; or $C_{1-2}$alkyl.

In an embodiment, the composition according to any of the embodiments described herein comprises (b) at least one compound of formula (I), wherein, $L^1$ is $C_{1-8}$alkylene; preferably $C_{1-6}$alkylene; m is selected from 1 or 2; n is selected from 1 or 2.

In an embodiment, the composition according to any of the embodiments described herein comprises (b) at least one compound of formula (I), wherein $L^1$ is $C_{1-6}$alkylene; yet more preferably, $L^1$ is $C_{1-4}$alkylene; $L^2$ is $C_{1-3}$alkylene; preferably $L^2$ is $C_{1-2}$alkylene; $L^3$ is $C_{1-3}$alkylene; preferably $L^3$ is $C_{1-2}$alkylene; $L^4$ is $C_{1-4}$alkylene; preferably $L^4$ is $C_{1-3}$alkylene; preferably $L^4$ is $C_{1-2}$alkylene; $L^5$ is $C_{1-4}$alkylene; preferably $L^5$ is $C_{1-3}$alkylene; preferably $L^5$ is $C_{1-2}$alkylene; n is an integer selected from 1, 2, 3; preferably n is 1 or 2; m is an integer selected from 1, 2 or 3, preferably m is 1 or 2; $R^1$ is H; or $C_{1-4}$alkyl; preferably $R^1$ is H; or $C_{1-3}$alkyl; preferably $R^1$ is H; or $C_{1-2}$alkyl; and $R^2$ is H; or $C_{1-4}$alkyl; preferably $R^2$ is H; or $C_{1-3}$alkyl; preferably $R^2$ is H; or $C_{1-2}$alkyl.

In an embodiment, the composition according to any of the embodiments described herein comprises (b) at least one compound of formula (I), wherein $L^1$ is $C_{1-4}$alkylene; $L^2$ is $C_{1-3}$alkylene; preferably $L^2$ is $C_{1-2}$alkylene; $L^3$ is $C_{1-3}$alkylene; preferably $L^3$ is $C_{1-2}$alkylene; $L^5$ is $C_{1-3}$alkylene; preferably $L^5$ is $C_{1-2}$alkylene; n is 1 or 2; m is 1 or 2; $R^1$ is H; or $C_{1-3}$alkyl; preferably $R^1$ is H; or $C_{1-2}$alkyl; and $R^2$ is H; or $C_{1-3}$alkyl; preferably $R^2$ is H; or $C_{1-2}$alkyl.

In yet another embodiment, the composition according to any of the embodiments described herein comprises (b) at least one compound of formula (I) selected from the group comprising bis(2-(2-butoxyethoxy)ethyl)adipate, bis(2-butoxyethyl)succinate; bis(2-(2-butoxyethoxy)ethyl)pimelate, bis(2-(2-(2-butoxyethoxy)ethoxy)ethyl)adipate, bis(2-butoxyethyl)adipate, bis(2-(2-(2-butoxyethoxy)ethoxy)ethyl)glutarate, bis(2-(2-(2-butoxyethoxy)ethoxy)ethyl)succinate, and bis(2-(2-butoxyethoxy)ethyl)succinate. Preferably, the composition according to any of the embodiments described herein comprises (b) at least one compound selected from the group consisting of bis(2-(2-butoxyethoxy)ethyl)adipate, bis(2-butoxyethyl)succinate; bis(2-(2-butoxyethoxy)ethyl)pimelate, bis(2-(2-(2-butoxyethoxy)ethoxy)ethyl)adipate, bis(2-butoxyethyl)adipate, bis(2-(2-(2-butoxyethoxy)ethoxy)ethyl)glutarate, bis(2-(2-(2-butoxyethoxy)ethoxy)ethyl)succinate, and bis(2-(2-butoxyethoxy)ethyl)succinate.

Preferably, the composition comprises:

(a) at least one poly-lactide comprising polymer selected from the group consisting of poly-lactide, poly-lactide-polybutadiene block copolymer, poly-lactide-urethane-polybutadiene block copolymer, poly-lactide-urethane, and mixture thereof; preferably selected from the group consisting of poly-lactide, poly-lactide-polybutadiene block copolymer, poly-lactide-urethane, and mixture thereof; more preferably selected from the group consisting of poly-lactide, poly-lactide-polybutadiene block copolymer, and mixture thereof; more preferably said at least one poly-lactide comprising polymer is poly-lactide; and (b) at least one compound of formula (I), selected from the group comprising bis(2-(2-butoxyethoxy)ethyl)adipate, bis(2-butoxyethyl)succinate; bis(2-(2-butoxyethoxy)ethyl)pimelate, bis(2-(2-(2-butoxyethoxy)ethoxy)ethyl)adipate, bis(2-butoxyethyl)adipate, bis(2-(2-(2-butoxyethoxy)ethoxy)ethyl)glutarate, bis(2-(2-(2-butoxyethoxy)ethoxy)ethyl)succinate, and bis(2-(2-butoxyethoxy)ethyl)succinate;

wherein the poly-lactide in said poly-lactide comprising polymer is selected from poly-L-lactide comprising a content of D isomer of at least 20% by weight based on the total weight of the poly-L-lactide; poly-D-lactide comprising a content of L isomer of at least 20% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 20% by weight based on the total weight of the poly-L-lactide. More preferably, the poly-lactide in said poly-lactide comprising polymer is selected from poly-L-lactide comprising a content of D isomer of at least 25% by weight based on the total weight of the poly-L-lactide; poly-D-lactide comprising a content of L isomer of at least 25% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 25% by weight based on the total weight of the poly-L-lactide. Yet more preferably, the poly-lactide in said poly-lactide comprising polymer is selected from poly-L-lactide comprising a content of D isomer of at least 28% by weight based on the total weight of the poly-L-lactide; poly-D-lactide comprising a content of L isomer of at least 28% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 28% by weight based on the total weight of the poly-L-lactide. Yet more preferably, the poly-lactide in said poly-lactide comprising polymer is selected from poly-L-lactide comprising a content of D isomer of at least 29% by weight based on the total weight of the poly-L-lactide; poly-D-lactide comprising a content of L isomer of at least 29% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 29% by weight based on the total weight of the poly-L-lactide.

Preferably, the at least one compound of formula (I) is selected from bis(2-(2-butoxyethoxy)ethyl)adipate, bis(2-butoxyethyl)adipate, bis(2-(2-butoxyethoxy)ethyl)succinate, and bis(2-butoxyethyl)succinate. Preferably, the at least one compound of formula (I) is selected from bis(2-(2-butoxyethoxy)ethyl)adipate, and bis(2-butoxyethyl)succinate.

The composition may comprise at least 3% by weight of said (b) at least one compound of formula (I) based on the total weight of the composition. For example, the composition may comprise at least 5% by weight of said (b) at least one compound of formula (I) based on the total weight of the composition; for example at least 10% by weight; for example at least 15% by weight; for example at least 20% by weight; for example at least 22% by weight, for example from 3% to 45% by weight; for example from 5% to 45% by weight; for example from 10% to 45% by weight, for example from 10% to 40% by weight, for example for example from 10% to 35% by weight, for example from 15% to 35% by weight, for example from 20% to 35% by weight, of said (b) at least one compound of formula (I) based on the total weight of the composition.

Preferably, the composition comprises:

(a) at least one poly-lactide comprising polymer selected from the group consisting of poly-lactide, poly-lactide-polybutadiene block copolymer, poly-lactide-urethane-polybutadiene block copolymer, poly-lactide-urethane, and mixture thereof; preferably selected from the group consisting of poly-lactide, poly-lactide-polybutadiene block copolymer, poly-lactide-urethane, and mixture thereof; more preferably selected from the group consisting of poly-lactide, poly-lactide-polybutadiene block copolymer, and mixture thereof; more preferably said at least one poly-lactide comprising polymer is poly-lactide; and (b) at least 3% by weight of one compound of formula (I) based on the total weight of the composition, for example at least 5% by weight; for example at least 10% by weight; for example at least 15% by weight; for example at least 20% by weight; for example at least 22% by weight, for example from 3% to 45% by weight; for example from 5% to 45% by weight; for example from 10% to 45% by weight, for example from 10% to 40% by weight, for example for example from 10% to 35% by weight, for example from 15% to 35% by weight, for example from 20% to 35% by weight, wherein, $L^1$ is $C_{1-8}$alkylene; or $C_{3-6}$cycloalkylene; each optionally substituted with one or more $C_{1-4}$alkyl; preferably $L^1$ is $C_{1-8}$alkylene; or $C_{3-6}$cycloalkylene; more preferably $L^1$ is $C_{1-8}$alkylene; yet more preferably $L^1$ is $C_{1-6}$alkylene; yet more preferably, $L^1$ is $C_{1-4}$alkylene; $L^2$ is $C_{1-6}$alkylene; preferably $L^2$ is $C_{1-4}$alkylene; preferably $L^2$ is $C_{1-3}$alkylene; preferably $L^2$ is $C_{1-2}$alkylene; $L^3$ is $C_{1-6}$alkylene; preferably L³ is C₁₋₄alkylene; preferably L³ is C₁₋₃alkylene; preferably L³ is C₁₋₂alkylene; L⁴ is C₁₋₆alkylene; preferably L⁴ is C₁₋₅alkylene; preferably L⁴ is C₁₋₄alkylene; preferably L⁴ is C₁₋₃alkylene; preferably L⁴ is C₁₋₂alkylene; L⁵ is C₁₋₆alkylene; preferably L⁵ is C₁₋₅alkylene; preferably L⁵ is C₁₋₄alkylene; preferably L⁵ is C₁₋₃alkylene; preferably L⁵ is C₁₋₂alkylene; n is an integer selected from 1, 2, 3 or 4; preferably n is 1, 2 or 3, preferably n is 1 or 2; m is an integer selected from 1, 2, 3 or 4; preferably m is 1, 2 or 3, preferably m is 1 or 2; R¹ is H; or C₁₋₆alkyl; preferably R¹ is H; or C₁₋₄alkyl; preferably R¹ is H; or C₁₋₃alkyl; preferably R¹ is H; or C₁₋₂alkyl; R² is H; or C₁₋₆alkyl; preferably R² is H; or C₁₋₄alkyl; preferably R² is H; or C₁₋₃alkyl; preferably R² is H; or C₁₋₂alkyl; preferably at least 3% by weight of at least one compound of formula (I) based on the total weight of the composition wherein said compound is selected from the group comprising bis(2-(2-butoxyethoxy)ethyl)adipate, bis(2-butoxyethyl)succinate; bis(2-(2-butoxyethoxy)ethyl)pimelate, bis(2-(2-(2-butoxyethoxy)ethoxy)ethyl)adipate, bis(2-butoxyethyl)adipate, bis(2-(2-(2-butoxyethoxy)ethoxy)ethyl)glutarate, bis(2-(2-(2-butoxyethoxy)ethoxy)ethyl)succinate, and bis(2-(2-butoxyethoxy)ethyl)succinate;

wherein the poly-lactide in said poly-lactide comprising polymer is selected from poly-L-lactide comprising a content of D isomer of at least 20% by weight based on the total weight of the poly-L-lactide; poly-D-lactide comprising a content of L isomer of at least 20% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 20% by weight based on the total weight of the poly-L-lactide. More preferably, the poly-lactide in said poly-lactide comprising polymer is selected from poly-L-lactide comprising a content of D isomer of at least 25% by weight based on the total weight of the poly-L-lactide; poly-D-lactide comprising a content of L isomer of at least 25% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 25% by weight based on the total weight of the poly-L-lactide. Yet more preferably, the poly-lactide in said poly-lactide comprising polymer is selected from poly-L-lactide comprising a content of D isomer of at least 28% by weight based on the total weight of the poly-L-lactide; poly-D-lactide comprising a content of L isomer of at least 28% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 28% by weight based on the total weight of the poly-L-lactide. Yet more preferably, the poly-lactide in said poly-lactide comprising polymer is selected from poly-L-lactide comprising a content of D isomer of at least 29% by weight based on the total weight of the poly-L-lactide; poly-D-lactide comprising a content of L isomer of at least 29% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 29% by weight based on the total weight of the poly-L-lactide.

In some embodiments, the composition may comprise at least 40% by weight of the at least one poly-lactide comprising polymer (a) based on the total weight of the composition; and at least 3% by weight of said (b) at least one compound of formula (I) based on the total weight of the composition.

In some embodiments, the composition may comprise at least 40% by weight of the at least one poly-lactide comprising polymer (a) based on the total weight of the composition; and at least 5% by weight of said (b) at least one compound of formula (I) based on the total weight of the composition.

In some embodiments, the composition may comprise at least 40% by weight of the at least one poly-lactide comprising polymer (a) based on the total weight of the composition; and at least 10% by weight of said (b) at least one compound of formula (I) based on the total weight of the composition.

In some embodiments, the composition may comprise at least 40% by weight of the at least one poly-lactide comprising polymer (a) based on the total weight of the composition; and at least 15% by weight of said (b) at least one compound of formula (I) based on the total weight of the composition.

Preferably, the composition comprises:

(a) at least 40% by weight of the at least one poly-lactide comprising polymer (a) based on the total weight of the composition, wherein said at least one poly-lactide comprising polymer is selected from the group consisting of poly-lactide, poly-lactide-polybutadiene block copolymer, poly-lactide-urethane-polybutadiene block copolymer, poly-lactide-urethane, and mixture thereof; preferably selected from the group consisting of poly-lactide, poly-lactide-polybutadiene block copolymer, poly-lactide-urethane, and mixture thereof; more preferably selected from the group consisting of poly-lactide, poly-lactide-polybutadiene block copolymer, and mixture thereof; more preferably said at least one poly-lactide comprising polymer is poly-lactide; and (b) and at least 3% by weight of said at least one compound of formula (I) based on the total weight of the composition, for example at least 5% by weight; for example at least 10% by weight; for example at least 15% by weight; for example at least 20% by weight; for example at least 22% by weight, for example from 3% to 45% by weight; for example from 5% to 45% by weight; for example from 10% to 45% by weight, for example from 10% to 40% by weight, for example for example from 10% to 35% by weight, for example from 15% to 35% by weight, for example from 20% to 35% by weight, wherein said compound of formula (I) is selected from the group comprising bis(2-(2-butoxyethoxy)ethyl)adipate, bis(2-butoxyethyl)succinate; bis(2-(2-butoxyethoxy)ethyl)pimelate, bis(2-(2-(2-butoxyethoxy)ethoxy)ethyl)adipate, bis(2-butoxyethyl)adipate, bis(2-(2-(2-butoxyethoxy)ethoxy)ethyl)glutarate, bis(2-(2-(2-butoxyethoxy)ethoxy)ethyl)succinate, and bis(2-(2-butoxyethoxy)ethyl)succinate;

wherein the poly-lactide in said poly-lactide comprising polymer is selected from poly-L-lactide comprising a content of D isomer of at least 20% by weight based on the total weight of the poly-L-lactide; poly-D-lactide comprising a content of L isomer of at least 20% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 20% by weight based on the total weight of the poly-L-lactide. More preferably, the poly-lactide in said poly-lactide comprising polymer is selected from poly-L-lactide comprising a content of D isomer of at least 25% by weight based on the total weight of the poly-L-lactide; poly-D-lactide comprising a content of L isomer of at least 25% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 25% by weight based on the total weight of the poly-L-lactide. Yet more preferably, the poly-lactide in said poly-lactide comprising polymer is selected from poly-L-lactide comprising a content of D isomer of at least 28% by weight based on the total weight of the poly-L-lactide; poly-D-lactide comprising a content of L isomer of at least 28% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 28% by weight based on the total weight of the poly-L-lactide. Yet more preferably, the poly-lactide in said poly-lactide comprising polymer is selected from poly-L-lactide comprising a content of D isomer of at least 29% by weight based on the total weight of the poly-L-lactide; poly-D-lactide comprising a content of L isomer of at least 29% by weight based on the total weight of the poly-D-lactide; poly-DL-lactide; poly(meso-lactide), and mixture thereof; preferably the poly-lactide in said poly-lactide comprising polymer is selected from poly-L-lactide comprising a content of D isomer of at least 29% by weight based on the total weight of the poly-L-lactide.

Preferably, the composition according to embodiments described herein comprises:
(a) at least 40% by weight of poly-lactide based on the total weight of the composition; of said poly-lactide; and (b) at least 3% by weight of said compound of formula (I) based on the total weight of the composition;
wherein said poly-lactide is poly-L-lactide comprising a content of D isomer of at least 10% by weight of the poly-L-lactide; or wherein said poly-lactide is poly-D-lactide comprising a content of L isomer of at least 10% by weight of the poly-D-lactide; or wherein said poly-lactide is poly-DL-lactide; or poly-meso-lactide, or a combination thereof.

Preferably, the composition according to embodiments described herein comprises:
(a) at least 40% by weight of poly-L-lactide based on the total weight of the composition; of said poly-lactide; and (b) at least 3% by weight of said compound of formula (I) based on the total weight of the composition; wherein said poly-L-lactide comprises a content of D isomer of at least 10% by weight of the poly-L-lactide.

Preferably, the composition according to embodiments described herein comprises:
(a) at least 40% by weight of poly-L-lactide based on the total weight of the composition; of said poly-lactide; and (b) at least 3% by weight of said compound of formula (I) based on the total weight of the composition; wherein said poly-L-lactide comprises a content of D isomer of at least 20% by weight of the poly-L-lactide.

Preferably, the composition according to embodiments described herein comprises:
(a) at least 40% by weight of poly-L-lactide based on the total weight of the composition; of said poly-lactide; and (b) at least 3% by weight of said compound of formula (I) based on the total weight of the composition; wherein said poly-L-lactide comprises a content of D isomer of at least 30% by weight of the poly-L-lactide.

Preferably, the composition according to embodiments described herein comprises:
(a) at least 50% by weight of poly-L-lactide based on the total weight of the composition; of said poly-lactide; and (b) at least 3% by weight of said compound of formula (I) based on the total weight of the composition; wherein said poly-L-lactide comprises a content of D isomer of at least 10% by weight of the poly-L-lactide.

Preferably, the composition according to embodiments described herein comprises:
(a) at least 50% by weight of poly-L-lactide based on the total weight of the composition; of said poly-lactide; and (b) at least 5% by weight of said compound of formula (I) based on the total weight of the composition; wherein said poly-L-lactide comprises a content of D isomer of at least 10% by weight of the poly-L-lactide.

Preferably, the composition according to embodiments described herein comprises:
(a) at least 50% by weight of poly-L-lactide based on the total weight of the composition; of said poly-lactide; and (b) at least 10% by weight of said compound of formula (I) based on the total weight of the composition; wherein said poly-L-lactide comprises a content of D isomer of at least 10% by weight of the poly-L-lactide.

Preferably, the composition according to embodiments described herein comprises:
(a) at least 50% by weight of poly-L-lactide based on the total weight of the composition; of said poly-lactide; and (b) at least 20% by weight of said compound of formula (I) based on the total weight of the composition; wherein said poly-L-lactide comprises a content of D isomer of at least 10% by weight of the poly-L-lactide.

Preferably, the composition according to embodiments described herein comprises:
(a) at least 50% by weight of poly-L-lactide based on the total weight of the composition; of said poly-lactide; and (b) at least 20% by weight of at least one compound of formula (I) based on the total weight of the composition wherein said compound is selected from the group comprising bis(2-(2-butoxyethoxy)ethyl)adipate, bis(2-butoxyethyl)succinate; bis(2-(2-butoxyethoxy)ethyl)pimelate, bis(2-(2-(2-butoxyethoxy)ethoxy)ethyl)adipate, bis(2-butoxyethyl)adipate, bis(2-(2-(2-butoxyethoxy)ethoxy)ethyl)glutarate, bis(2-(2-(2-butoxyethoxy)ethoxy)ethyl)succinate, and bis(2-(2-butoxyethoxy)ethyl)succinate; wherein said poly-L-lactide comprises a content of D isomer of at least 10% by weight of the poly-L-lactide.

Preferably, the composition according to embodiments described herein comprises:
(a) at least 50% by weight of poly-L-lactide based on the total weight of the composition; of said poly-lactide; and (b) at least 20% by weight of bis(2-(2-butoxyethoxy)ethyl)adipate based on the total weight of the composition; wherein said poly-L-lactide comprises a content of D isomer of at least 10% by weight of the poly-L-lactide.

In an embodiment, the composition according to embodiments described herein may comprise one or more additives to impart desired physical properties, such as printability, increased gloss, or a reduced blocking tendency. Examples of additives may include, without limitation, anti-block additives, slip additives, stabilizers, ultra-violet screening agents, oxidants, anti-oxidants, antistatic agents, ultraviolet light absorbents, fire retardants, processing oils, mold release agents, coloring agents, pigments/dyes, fillers or combinations thereof, for example. These additives may be included in amounts effective to impart desired properties.

In a preferred embodiment, the composition according to embodiments described herein may comprise one or more additives selected from the group comprising N,N'-Ethylene Bis(Stearamide) (EBS), erucamide, natural silica, synthetic silica, talc, talc filled magnesium, calcium carbonate, oleamide, stearamide, behenamide, oleyl palmitamide, stearyl erucamide, ethylene bis-oleamide, or a combination thereof, and preferably EBS in some embodiments. In a preferred embodiment, the composition comprises at least 0.1% by weight to at most 5% by weight of said one or more additives based on the total weight of the composition. In a preferred embodiment, the composition comprises at least 0.1% by weight to at most 5.0% by weight of said one or more additives based on the total weight of the composition, wherein said one or more additives is selected from the group comprising N,N'-Ethylene Bis(Stearamide) (EBS), erucamide, natural silica, synthetic silica, talc, talc filled magnesium, calcium carbonate, oleamide, stearamide, behenamide, oleyl palmitamide, stearyl erucamide, ethylene bis-oleamide, or a combination thereof. In a preferred embodiment, the composition comprises at least 0.2% by weight to at most 5.0% by weight of said one or more additives based on the total weight of the composition, wherein said one or more additives is selected from the group comprising N,N'-Ethylene Bis(Stearamide) (EBS), erucamide, natural silica, synthetic silica, talc, talc filled magnesium, calcium carbonate, oleamide, stearamide, behenamide, oleyl palmitamide, stearyl erucamide, ethylene bis-oleamide, or a combination thereof.

According to the second aspect, the present invention also encompasses a process for preparing a composition according to the present invention, comprising the step of:

contacting at least one poly-lactide comprising polymer with at least one compound of formula (I), wherein said at least one poly-lactide comprising polymer is selected from the group consisting of poly-lactide, poly-lactide-polybutadiene block copolymer, poly-lactide-urethane-polybutadiene block copolymer, poly-lactide-urethane, and mixture thereof; and wherein, $L^1$ is $C_{1-8}$alkylene; $C_{3-6}$cycloalkylene; each optionally substituted with one or more $C_{1-4}$alkyl;

$L^2$ is $C_{1-6}$alkylene; $L^3$ is $C_{1-6}$alkylene; $L^4$ is $C_{1-6}$alkylene; $L^5$ is $C_{1-6}$alkylene;

n is an integer selected from 0, 1, 2, 3 or 4; m is an integer selected from 0, 1, 2, 3 or 4;

$R^1$ is H; or $C_{1-6}$alkyl; $R^2$ is H; or $C_{1-6}$alkyl; and wherein the poly-lactide in said poly-lactide comprising polymer is selected from poly-L-lactide comprising a content of D isomer of at least 10% by weight based on the total weight of the poly-L-lactide; poly-D-lactide comprising a content of L isomer of at least 10% by weight based on the total weight of the poly-D-lactide; poly(meso-lactide); poly-DL-lactide; and mixture thereof.

Any process known in the art can be applied for preparing a composition as presently described.

In some embodiments, said contacting step comprises melt blending the at least one polymer with the at least one compound of formula (I). In some embodiments, said melt blending process occurs, in a single step. The blending may occur by introducing the at least one polymer and the at least one compound of formula (I), into a system capable of combining and melting the components to initiate chemical and/or physical interactions between the first and second components. For example, the blending may be accomplished by introducing the at least one polymer and the at least one compound of formula (I) into a batch mixer, continuous mixer, single screw extruder or twin screw extruder, for example, to form a homogeneous mixture or solution while providing temperature conditions so as to melt the blend components and initiate chemical and physical interactions between the components as described above.

In some embodiments, said contacting step comprises melt blending the at least one polymer with one or more optional additives and with the at least one compound of formula (I). Preferably, the one or more additives can be selected from the group comprising N,N'-Ethylene Bis (Stearamide) (EBS), erucamide, natural silica, synthetic silica, talc, talc filled magnesium, calcium carbonate, oleamide, stearamide, behenamide, oleyl palmitamide, stearyl erucamide, ethylene bis-oleamide, or a combination thereof, and preferably EBS in some embodiments.

In an embodiment, the composition is melt blended at a temperature ranging from 120° C. to 230° C., for example from 120° C. to 200° C., for example from 120° C. to 180° C.

In an embodiment, the composition is prepared by extrusion. In an embodiment, the composition is extruded at a temperature of at least 100° C., for example of at least 110° C., for example of at least 120° C., for example at least 130° C. More preferably, the composition is extruded at a temperature ranging from 120° C. to 230° C.

In a preferred embodiment, the residence time in the extruder is at most 30 minutes, more preferably at most 20 minutes, more preferably at most 10 minutes, more preferably at most 8 minutes, more preferably at most 5 minutes, for example at most 4 min, for example at most 3 min. As used herein, the term "residence time" refers to the time wherein the mixture is present in the extruder, or is present in a series of extruders.

In an embodiment, any of the previously described compositions may further comprise additives to impart desired physical properties, such as printability, increased gloss, or a reduced blocking tendency. Examples of additives may include, without limitation, anti-block additives, slip additives, stabilizers, ultra-violet screening agents, oxidants, anti-oxidants, antistatic agents, ultraviolet light absorbents, fire retardants, processing oils, mold release agents, coloring agents, pigments/dyes, fillers or combinations thereof, for example. These additives may be included in amounts effective to impart desired properties.

In some embodiments, said process for preparing a composition according to the present invention, further comprises processing the composition using one or more polymer processing techniques selected from film, sheet, pipe and fiber extrusion or coextrusion; blow molding; injection molding; rotary molding; foaming; 3D-printing; and thermoforming.

The present invention also encompasses the use of a composition according to the present invention in polymers, membranes, adhesives, foams, sealants, molded articles, films, extruded articles, fibers, elastomers, polymer based additives, pharmaceutical and biomedical products, varnishes, paints, coatings, inks; composite material organic LEDs, organic semiconductors, conducting organic polymers, and 3D printed articles.

The present invention also encompasses a method for formulating polymers, membranes, adhesives, foams, sealants, molded articles, films, extruded articles, fibers, elastomers, polymer based additives, pharmaceutical and biomedical products, varnishes, paints, coatings, inks; or composite material, comprising adding the composition according to the present invention to said polymers, membranes, adhesives, foams, sealants, molded articles, films, extruded articles, fibers, elastomers, polymer based additives, pharmaceutical and biomedical products, varnishes, paints, coatings, inks; or composite material.

The present invention also encompasses polymers, membranes, adhesives, foams, sealants, molded articles, films, extruded articles, fibers, elastomers, polymer based additives, pharmaceutical and biomedical products, varnishes, paints, coatings, inks; composite material, organic LEDs, organic semiconductors, and conducting organic polymers, 3D printed articles, comprising the composition according to the present invention.

The present invention also encompasses an article comprising a composition according to any of the embodiments previously described for the present invention, or prepared using a process according to the invention.

In some embodiments, said article comprising a composition according to any of the embodiments previously described for the present invention, or prepared using a process according to the invention; is a shaped article.

In some embodiments, said shaped article comprising a composition according to any of the embodiments previously described for the present invention, or prepared using a process according to the invention; is a molded article.

In an embodiment, said shaped article is produced by polymer processing techniques known to one of skill in the art, such as blow molding, injection molding, rotary molding, compression molding; thermoforming, and 3D printing.

The present inventors have surprisingly found that the present compositions may be used in the manufacture of 3D printed articles, and that the resulting article has improved adhesion between the printed layers, which greatly stabilizes the 3D printed article, which greatly stabilizes the 3D printed article, allowing for the printing of intricate and complicated shapes.

The present invention also encompasses a 3D printed article comprising a composition according to the first aspect of the invention, or prepared using a process according to the second aspect of the invention.

As used herein, "3D printed article" refers to an object built by a 3D printing system. 3D printed articles according to the present invention include prototypes, ornamental and decorative objects, industrial pieces, prosthetic implants and medical devices, architectural reproductions, eyewear, and fashion articles such as shoes.

As used herein, "3D printing", or "three-dimensional (3D) printing" also referred to as additive manufacturing, rapid prototyping or solid freeform fabrication, is a process of making a three-dimensional solid object from a digital model. The basic principle of 3D printing resides on building a product layer by layer from a particular material. In some embodiments, the material used for producing a 3D printed article according to the present invention comprises a composition according to the first aspect of the invention, or prepared using a process according to the second aspect of the invention.

In an embodiment, the compositions and blends thereof may be formed into a wide variety of articles such as films, pipes, fibers (e.g., dyeable fibers), rods, containers, bags, packaging materials, and adhesives (e.g., hot melt adhesives) for example, by polymer processing techniques known to one of skill in the art, such as forming operations including film, sheet, pipe and fiber extrusion and co-extrusion as well as blow molding, injection molding, rotary molding, and thermoforming, for example. Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, hot melt adhesives, sheets, such as thermoformed sheets (including profiles and plastic corrugated cardboard), geomembranes and pond liners, for example. Molded articles include single and multilayered constructions in the form of bottles, tanks, large hollow articles, rigid food containers and toys, for example.

The inventors have surprisingly found that the compositions of the invention present self-healing properties. The composition is especially useful for the preparation of self-healing materials.

In case of fracture, the self-healing process of the composition of the invention takes place in a reduced period of time and without the need of any external stimulus, such as heat or light. So, when an article made with the composition is cut into two pieces it can restore/repair again, in some cases even in a question of seconds, by just putting the pieces in contact together.

The present invention therefore also encompasses a process for reshaping and/or repairing an article comprising a compound according to the first aspect of the invention, comprising the step of step of contacting the parts of the article to be reshaped and/or repaired with each other, preferably at room temperature.

The present invention also encompasses a process for reshaping and/or repairing an article comprising a compound according to the first aspect of the invention, comprising the step of step of contacting the parts of the article to be reshaped and/or repaired with each other at a temperature of at least 20° C.

The present invention also encompasses a self-healing material comprising a composition according to the first aspect of the invention.

The self-healing material can be preferably used for coatings, asphalts, biomedical applications, automobile industry and aerospace industry. In the field of coating the self-healing polymer can be used as isolation material or surface protection. Biomedical applications for examples are support devices for bones and vascular or implants for extremities. In automobile and aerospace industry the self-healing polymer can be used for car or aircraft body panels or for interior devices—for examples dashboards or trays.

The present invention can be further illustrated by the following examples, although it will be understood that these examples are included merely for purposes of illustration and are not intended to limit the scope of the invention unless otherwise specifically indicated.

EXAMPLES

Unless otherwise indicated, all parts and all percentages in the following examples, as well as throughout the specification, are parts by weight or percentages by weight wt) respectively.

Example 1

Compositions according to embodiments of the invention were prepared by blending amorphous PLA (Ingeo™ 4060D from NatureWorks LLC with an D-isomer content of 12% wt, as measured by NMR) with 1% wt of N,N'-ethylene-bis-stearamide (Crodamide™ EBS from Croda, CAS 110-30-5); and with either bis(2-(2-butoxyethoxy)ethyl)adipate (from Condensia Quimica) or bis(2-butoxyethyl)succinate (also known as "bis(2-butoxyethyl) butanedioate" commercially available under CAS number 74724-04-2). The physical properties of Ingeo™ 4060D are shown in Table 1.

TABLE 1

| Typical Material & Application Properties | | | | |
|---|---|---|---|---|
| Coex Film Properties | | | Ingeo 4060D | ASTM Method |
| Density | | | 1.24 | D1505 |
| Optical Characteristics | Haze | | 2% | D1003 |
| | Gloss, 20° | | 90% | D1003 |
| Thermal Characteristics | Glass Transition Temp. | | 55-60° C. | D3418 |
| | Seal Initiation Temp. | | 80° C. | F88 |

Compositions 1 to 18 were prepared as follows: PLA pellets prepared as described herein above and the selected compound were mixed in a twin screw extruder (PVC Brabender), and extruded into strands. The temperature profile along the extruder barrel was 130° C., and the temperature at the die was 130° C. The screw speed was 50 rpm, torque 15 Nm.

An overview of all the prepared compositions is given in Table 2, as well as their physical and mechanical properties.

TABLE 2

| | | Composition No | | | | | | | | |
|---|---|---|---|---|---|---|---|---|---|---|
| | | 1 | 2 | 3 | 4 | 5 | 6 | 7 | 8 | 9 |
| PLA 4060 + 1% EBS | % w/w | 95 | 90.5 | 86.7 | 83.1 | 76.6 | 69.7 | 66.3 | 62.1 | 58.7 |
| Bis(2-(2-butoxyethoxy)ethyl) adipate | % w/w | 5 | 9.5 | 13.3 | 16.9 | 23.4 | 30.3 | 33.7 | 37.9 | 41.3 |
| $Tg_1$ | ° C. | 47.5 | 36 | 25.4 | 18.4 | 51.4 | 51.6 | 53.7 | | |
| $Tg_2$ | ° C. | | 35 | | 18.4 | 8.7 | | −8.6 | | |
| $Tm_1$ | ° C. | | | | | 107 (13 J/g) | | 104 (6 J/g) | | |
| $Tm_2$ | ° C. | | | | | 127 (1 J/g) | | | | |
| Module | Mpa | 2830 | 784 | | | | | | | |
| Elongation at break | % | | 214 | 304 | 334 | 202 | 218 | 295 | | |
| Strength at Break | MPa | | 28 | 18 | 13 | 4 | 7 | 8 | | |
| Whitening at 23° C. | Days | No whitening | No whitening | No whitening | 67 | 8 | 4 | 4 | 4 | 4 |
| Exudation at 23° C. | Days | No exudation | No exudation | No exudation | No exudation | 50 | 35 | 35 | 35 | 35 |
| Self-healing after 10 sec at 23° C. | | 1 | 1 | 2 | 3 | 4 | 5 | 2 | 2 | 2 |

| | | Composition No | | | | | | | | |
|---|---|---|---|---|---|---|---|---|---|---|
| | | 10 | 11 | 12 | 13 | 14 | 15 | 16 | 17 | 18 |
| PLA 4060 + 1% EBS | % w/w | 95 | 90.5 | 86.7 | 83.1 | 76.6 | 69.7 | 66.3 | 62.1 | 58.7 |
| Bis-(2-butoxyethyl)-succinate | % w/w | 5 | 9.5 | 13.3 | 16.9 | 23.4 | 30.3 | 33.7 | 37.9 | 41.3 |
| $Tg_1$ | ° C. | 51 | 33 | | 17 | 49 | | 52 | | |
| $Tg_2$ | ° C. | 49 | 38 | | 31 | 13 | | −5 | | |
| $Tm_1$ | ° C. | | | | | 103 (8 J/g) | | 97 (5 J/g) | | |
| Whitening at 23° C. | Days | No whitening | No whitening | | 60 | 7 | 2 | 2 | 2 | 2 |
| Exudation at 23° C. | Days | No exudation | No exudation | No exudation | No exudation | No exudation | 45 | 30 | 30 | 30 |
| Self-healing after 10 s at 23° C. | | 1 | 1 | | 2 | 5 | 4 | 2 | 2 | 2 |

Thermal properties of Compositions 1 to 18 were analyzed with Perkin-Elmer Pyris Diamond differential scanning calorimeter (DSC) calibrated with indium as standard. The specimens were heated from −50° C. to 220° C. at a rate of 20° C./min, followed by an isothermal for 3 min, and a subsequent cooling scan to −50° C. at a rate of 20° C./min followed by an isothermal for 3 min. And then were reheated to 220° C. at 20° C./min. Glass transition temperatures (Tg) and melting temperatures (Tm) were measured.

The modulus and tensile properties of Compositions 1 to 18 were measured as described in ISO 527-1 BA.

The whitening of Compositions 1 to 18 was determined by direct observation, keeping the samples at 23° C. and room humidity for up to 67 days.

The exudation of Compositions 1 to 18 was determined at 23° C., by placing the sample on a piece of paper against a sample, and measuring the traces/spots of plasticizer appearing on the paper below the sample. Samples were tested for exudation for up to 45 days.

To evaluate the self-healing properties of Compositions 1 to 18, extruded strand was cut in two pieces. The resulting pieces were pressed against each other at room temperature (23° C.) for about 10 seconds. The self-healing after pressing the samples for 10 seconds at 23° C. was classified from 1 to 5, with 1=no-self-healing, 2=acceptable self-healing, 3=quite good self-healing, 4=good self-healing, and 5=very good self-healing. The results are given in Table 2. FIG. 1 shows the self-healing properties of Composition 5. This composition exhibited the same tensile resistance after self-healing for 24 hours, as before cutting the strand.

Example 2

Compositions according to embodiments of the invention were prepared by blending amorphous PLA (Vyloecol® BE400 from Toyobo Co., Ltd with an D-isomer content of 20% wt) with 1% wt of N,N'-ethylene-bis-stearamide (Crodamide™ EBS from Croda, CAS 110-30-5); and with varying amounts of bis-(2-butoxyethyl)-succinate. PLA pellets and the selected compound were mixed in a twin screw extruder, and extruded into strands as described in Example 1. PLA Vyloecol® BE400 has a molecular weight of $43 \times 10^3$ Da, a specific gravity (at 30° C.) of 1.26 g/cm$^3$, a Tg of 50° C. and a hydroxyl group value of 3 KOH mg/g.

An overview of all the prepared compositions is given in Table 3, as well as their physical and mechanical properties, which were measured as described in Example 1.

TABLE 3

| | | Composition No | | | | | | | | |
|---|---|---|---|---|---|---|---|---|---|---|
| | | 19 | 20 | 21 | 22 | 23 | 24 | 25 | 26 | 27 |
| PLA Vyloecol BE400 + 1% EBS | % w/w | 95 | 90.5 | 86.7 | 83.1 | 76.6 | 69.7 | 66.3 | 62.1 | 58.7 |
| Bis-(2-butoxyethyl)-succinate | % w/w | 5 | 9.5 | 13.3 | 16.9 | 23.4 | 30.3 | 33.7 | 37.9 | 41.3 |
| Tg$_1$ | ° C. | 36.6 | 22.1 | 17.6 | 12.6 | | | | | |
| Tg$_2$ | ° C. | 53.4 | 30.7 | 21.6 | 13.9 | | | | | |
| Whitening at 23° C. | Days | No whitening | No whitening | No whitening | 35 | | | | | |
| Self-healing after 10 s at 23° C. | | 1 | 2 | 3 | | | | 5 | | |

Compositions 19 to 27 were prepared according to the method described in Example 1.

Glass transition temperatures, whitening and self-healing properties of the compositions were determined as described in Example 1.

Example 3

Compositions 29-33 according to embodiments of the invention were prepared by blending amorphous PLA (with an D-isomer content of 30% wt) with 1% wt of N,N'-ethylene-bis-stearamide (Crodamide™ EBS from Croda, CAS 110-30-5); and with varying amounts of bis(2-(2-butoxyethoxy)ethyl)adipate. PLA pellets and the selected compound were mixed in a twin screw extruder (PVC Brabender) and extruded into strands as described in Example 1.

The amorphous PLA with a D-isomer content of 30% wt, was prepared by reactive extrusion in a twin-screw extruder using 70% L-lactide (purity=99.5%) and 30% D-lactide (purity=99.8%), 1-octanol, Sn(Oct)$_2$, and antioxidant (Ultranox® 626). The length to diameter (L/D) ratio was 40, with D=20 mm, the residence time was about 20 minutes and the screw speed was adjusted to 50 rpm. The molar ratio of lactide monomer to 1-octanol was 800, the catalyst content was 343 ppm and Ultranox® 626 was introduced in a quantity of 0.25% wt. The extrusion was performed at a temperature of from 160° C. to 220° C. The obtained PLA had the following characteristic as measured using chromatography by gel permeation compared to a standard polystyrene in chloroform at 25° C.: Mn=90 000 g/mol; Mw=166 000 g/mol and I (polydispersity index)=2.02.

An overview of all the prepared compositions is given in Table 4, as well as their physical and mechanical properties.

TABLE 4

|  |  | Composition No | | | | |
|---|---|---|---|---|---|---|
|  |  | 28 | 29 | 30 | 31 | 32 | 33 |
| PLA + 1% EBS | % w/w | 95 | 90 | 85 | 80 | 70 | 60 |
| Bis(2-(2-butoxyethoxy)ethyl) adipate | % w/w | 5 | 10 | 15 | 20 | 30 | 40 |
| Tg$_1$ | ° C. |  |  |  | 14 | −11 | −31 |
| Tg$_2$ | ° C. |  |  |  | 14 | −7 | −23 |
| Whitening at 23° C. | Days |  |  |  | No whitening | No whitening | No whitening |
| Exudation at 23° C. | Hours |  |  |  | No exudation | No exudation | No exudation |
| Self-healing after 10 s at 23° C. |  |  |  |  | 5 | 5 | 5 |

Glass transition temperatures, whitening, exudation and self-healing properties were determined as described in Example 1.

Figure 2:
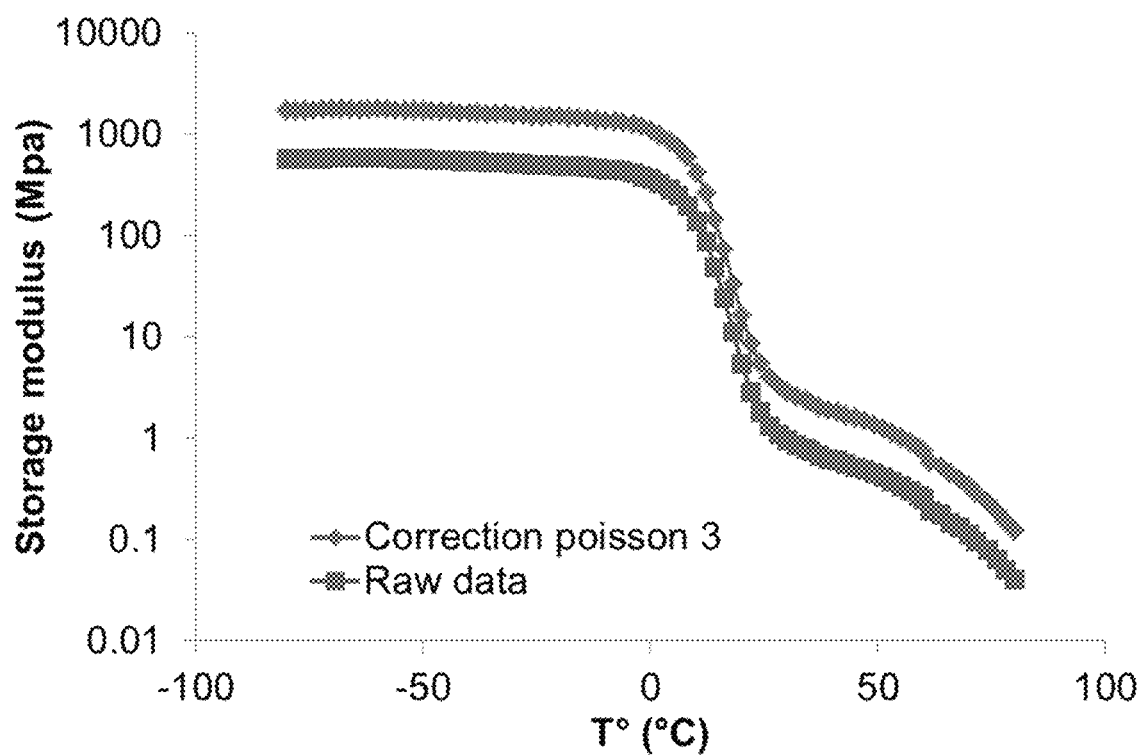
FIG. 2 represents a graph plotting the storage modulus (in MPa) of a composition according to an embodiment of the invention as a function of the temperature (° C.).
Figure 3:
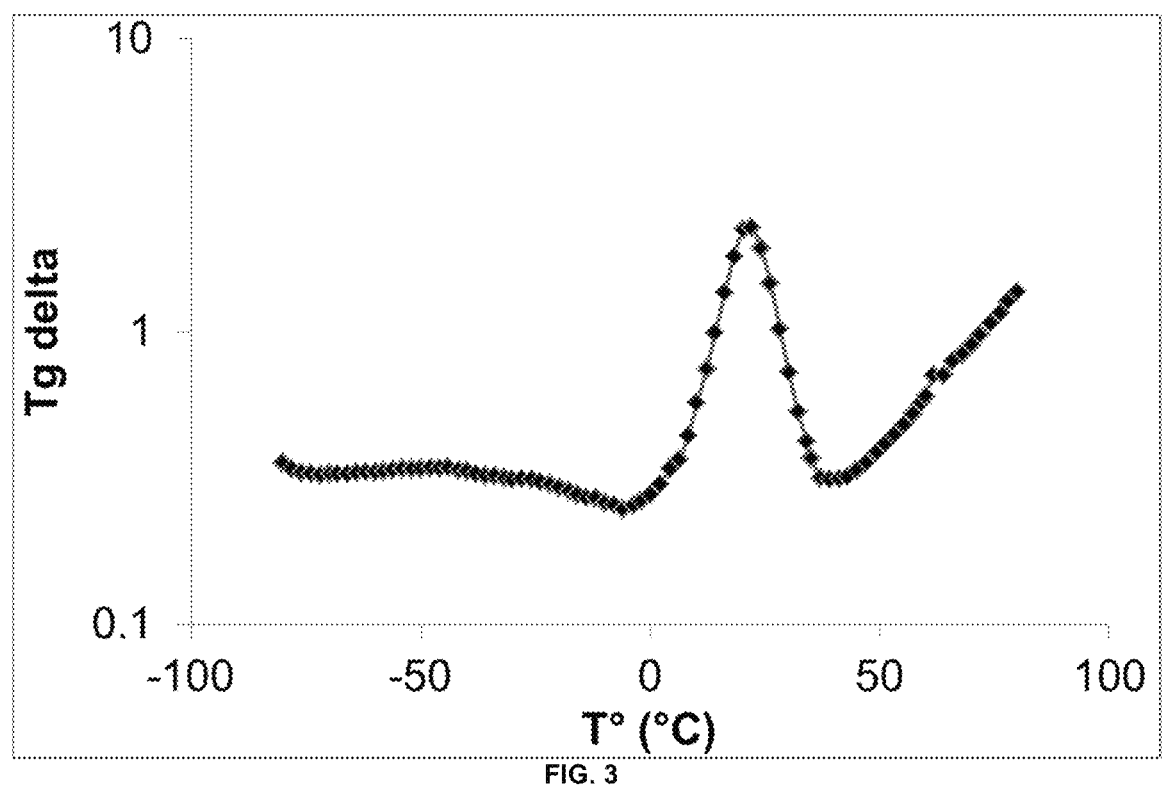
FIG. 3 represents a graph plotting the Tg delta of Composition 31 according to an embodiment of the invention as a function of the temperature.

Composition 31 was prepared at a larger scale. A dynamic rheometry analysis (RDA) was performed on said composition 31. Said RDA experiment was performed on an ARES rheometer from Ta Instruments. The temperature was varied between −80° C. and 80° C. The test was performed in torsion at a frequency of 1 Hz and with a heating rate of 2° C./min. The results are shown in FIG. 2 which plots the storage modulus of said composition as a function of the temperature and the data corrected cof. Poisson=3. FIG. 3 shows the plot of the Tg delta of the composition 31 as a function of temperature.

Figure 4:
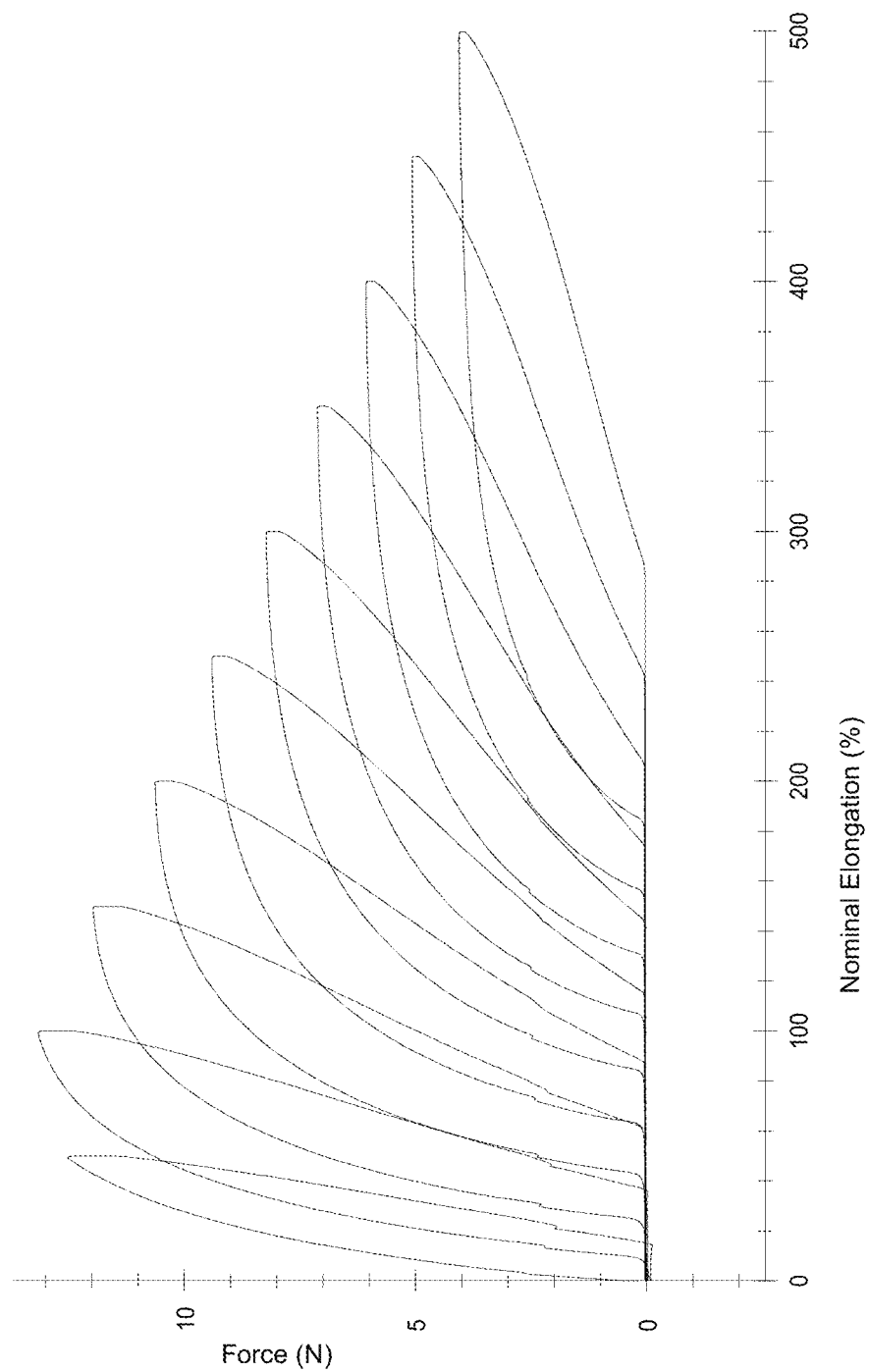
FIG. 4 represents a graph plotting the Force as a function of the Nominal elongation for Composition 31 according to an embodiment of the invention.

The hysteresis of Composition 31 was also measured at 23° C., on a Zwick mechanical testing machine using a cross-head speed of 500 mm/min by 50% deformation steps, according to ISO 527 1A. The results are shown in FIG. 4 which represents a plot of the Force (N) as a function of the nominal elongation for composition 31. The test was stopped manually after 10 cycles, after which 500% total deformation was observed. Elongation of about 100% was achieved applying 5 MPa. Elongation at break was 600%, with 0.5 MPa.

Figure 5:
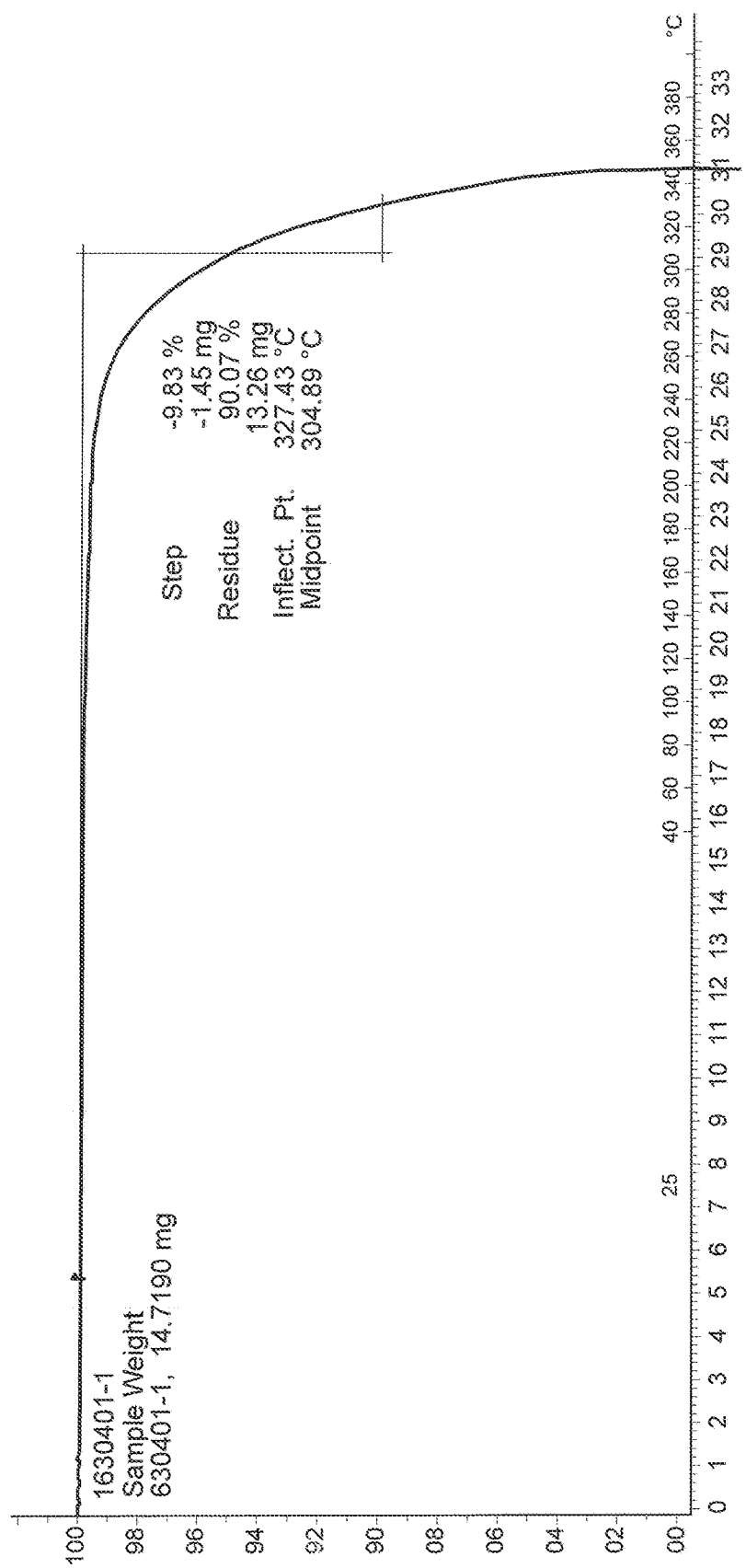
FIG. 5 represents a graph plotting the results of the thermogravimetric analysis (TGA) performed on Composition 31 according to an embodiment of the invention. The graph shows the amount of weight change (y=weight loss %) of the composition as a function of increasing temperature (x=0 to 400 is temperature in ° C.)/time (x=0 to 35 is test time in minutes).

A thermogravimetric analysis (TGA) was performed on Composition 31. Said TGA experiment was performed on a METTLER TOLEDO TGA/DSC1 STAR System Thermogravimetric Analyzer, under nitrogen atmosphere. The sample was heated from 25 to 400° C. with a rate of 20° C. minutes$^{-1}$, under nitrogen. The resulting thermogram is shown in FIG. 5.

Figure 6:
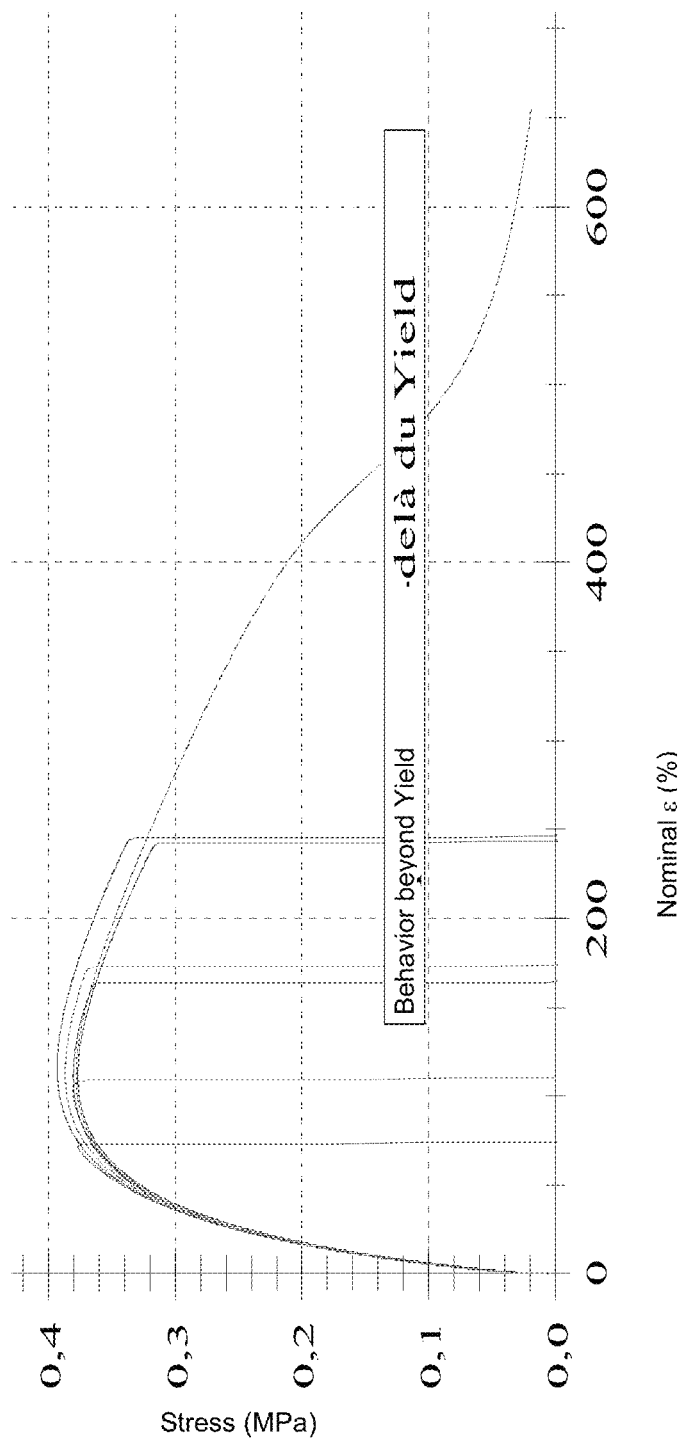
FIG. 6 represents a graph plotting the stress (MPa) measured as a function of the nominal elasticity (ε) and as a function of time for a composition according to an embodiment of the invention.

The properties of this composition were evaluated at 23° C./min. The results are shown in Table 5 and FIG. 6. FIG. 6 represents a graph plotting the stress (MPa) measured as a function of the nominal elasticity and as a function of time.

TABLE 5

| Nr | Info | Thickness mm | Width mm | σ Yield MPa | ε Yield % | σ 50% MPa | σ nom. Break MPa | ε nom Break. % |
|---|---|---|---|---|---|---|---|---|
| 1 | 3 minutes | 4.38 | 10.50 | — | — | 0.34 | 0.37 | 73.05 |
| 2 | 12 minutes | 4.21 | 10.10 | 0.38 | 103.14 | 0.33 | 0.36 | 109.23 |
| 3 | 1 hour | 4.10 | 10.10 | 0.38 | 109.54 | 0.33 | 0.36 | 163.27 |
| 4 | 2 hours | 4.12 | 10.20 | 0.39 | 111.99 | 0.34 | 0.36 | 172.38 |
| 5 | 1 day | 4.10 | 10.11 | 0.38 | 111.14 | 0.33 | 0.31 | 242.16 |
| 6 | 2 days | 4.19 | 10.33 | 0.39 | 114.15 | 0.34 | 0.33 | 245.00 |
| 7 | 7 days | 4.07 | 10.15 | 0.38 | 114.22 | 0.33 | 0.02 | 655.02 |

FIG. 6, shows the elastic recovery obtained after cutting and different waiting times of healing (total elasticity was recovered after 1 week of healing). The Nominal elongation at break was above 600%. The elastic recovery after 3 minute was 73%, after 12 minutes was 109%, after 1 hour was 163%, after 2 hours was 172%, after 1 day was 242%, after 2 days was 245% and after one week was 655%.

After one week at 23° C., 100% of the nominal elasticity of the strand was recovered (evaluated according to ISO 527 1A, tensile test at 500 mm/min).

Figure 7:
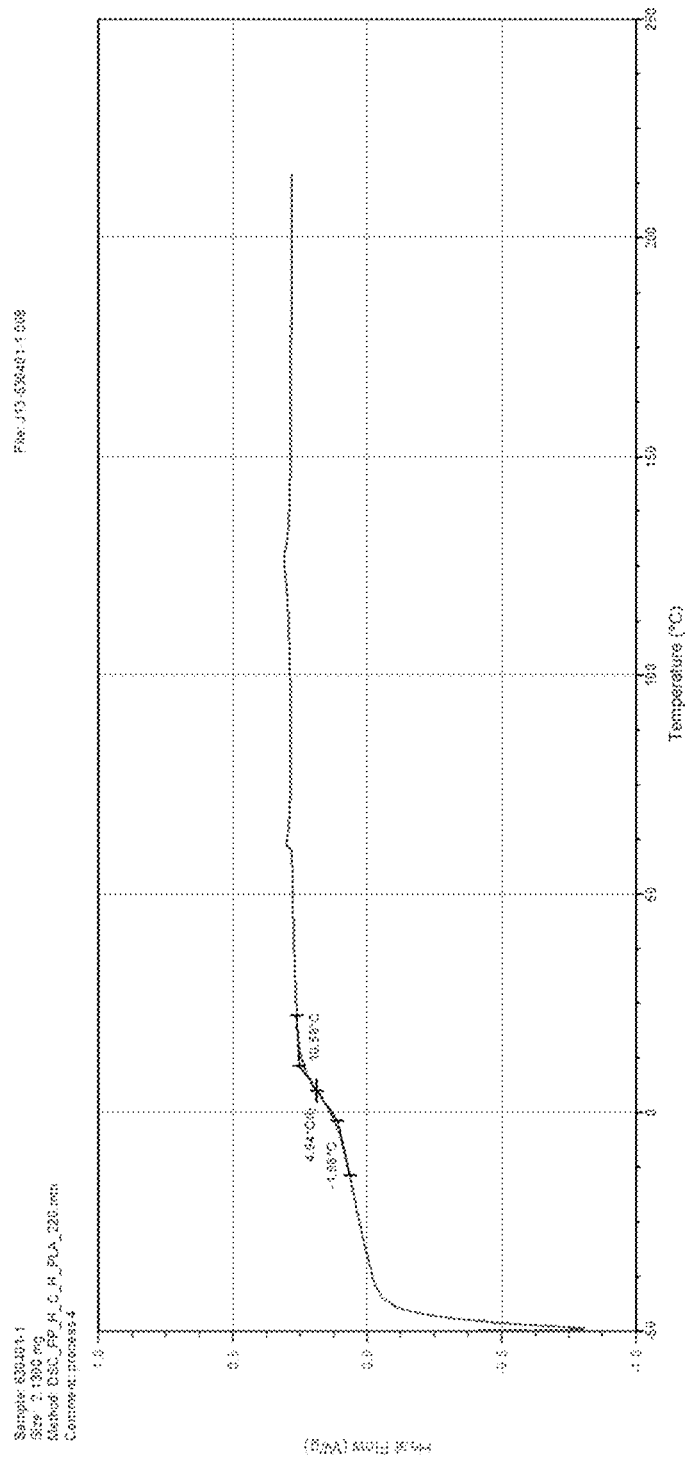
FIG. 7 represents a graph showing the DSC profile of composition 31 according to an embodiment of the invention.

The Tg measured for this composition 31 was about 5° C., there was no melting point and no recrystallization. FIG. 7 represents a graph showing the DSC profile of this composition.

Comparative Example 1

A comparative composition 1 was prepared by blending 80% wt PLA with an D-isomer content of 0.5% wt (Ingeo™ Biopolymer 3100HP from NatureWorks LLC with an D-isomer content of 0.5% wt, as measured by NMR) with 20% wt of bis(2-(2-butoxyethoxy)ethyl)adipate (from Condensia Quimica). PLA pellets and the selected adipate were mixed in a twin screw extruder (PVC Brabander), and extruded into strands as described in Example 1. The self-healing properties of the composition were evaluated as previously described on page 38. No self-healing at all occurred (score 1).

A comparative composition 2 was prepared by blending 80% wt PLA with an D-isomer content of 4% wt (Ingeo™ Biopolymer 3052D from NatureWorks LLC with an D-isomer content of 4% wt, as measured by NMR) with 20% wt of bis(2-(2-butoxyethoxy)ethyl)adipate (from Condensia Quimica). PLA pellets and the selected adipate were mixed in a twin screw extruder (PVC Brabander), and extruded into strands as described in Example 1. The self-healing properties of the composition were evaluated as previously described on page 38. No self-healing at all occurred (score 1).

Example 4. 3D Printed Article

A composition according to embodiments of the invention was prepared by blending amorphous PLA (Ingeo™ 4060D from NatureWorks LLC with an D-isomer content of 12% wt, as measured by NMR) with 5% wt of bis(2-(2-butoxyethoxy)ethyl)adipate (from Condensia Quemica).

Figure 8:
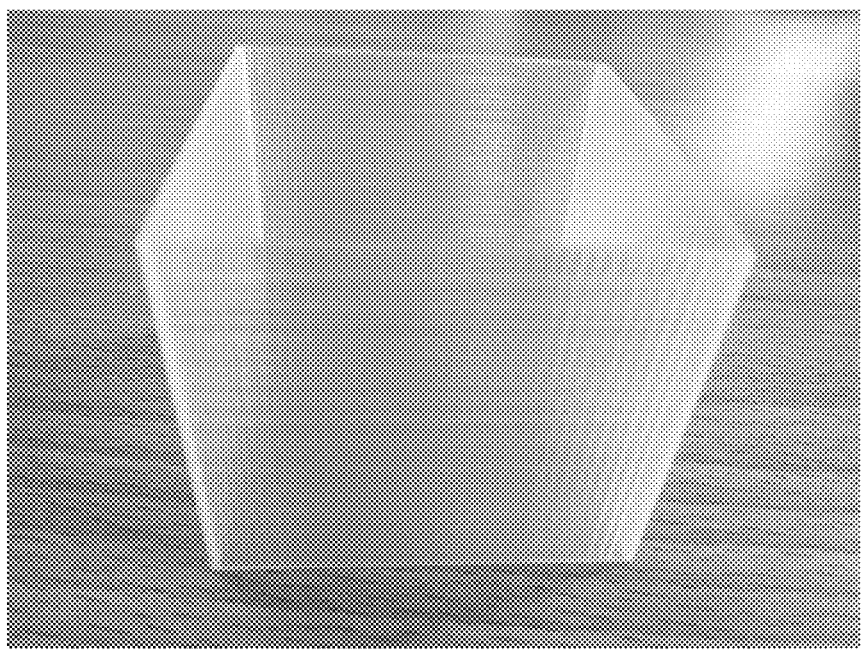
FIG. 8 represents a photograph of the 3D printed cube comprising a composition according to the invention.

PLA pellets and the adipate were mixed in a twin screw extruder (PVC Brabander), and extruded into strands. The temperature profile along the extruder barrel was 90-180° C., and the temperature at the die was 180° C. The screw speed was 50 rpm, torque 40-45 Nm. The resulting strands (filament thickness 1.71 mm) were used in a MakerBot Replicator 2 printer at 230° C. to print a two-walls cube wherein each wall was about 0.495 mm thick, the total thickness (thickness measured from two printed passes side by side) was about 1 mm. FIG. 8 shows the resulting translucent printed cube.

Figure 9:
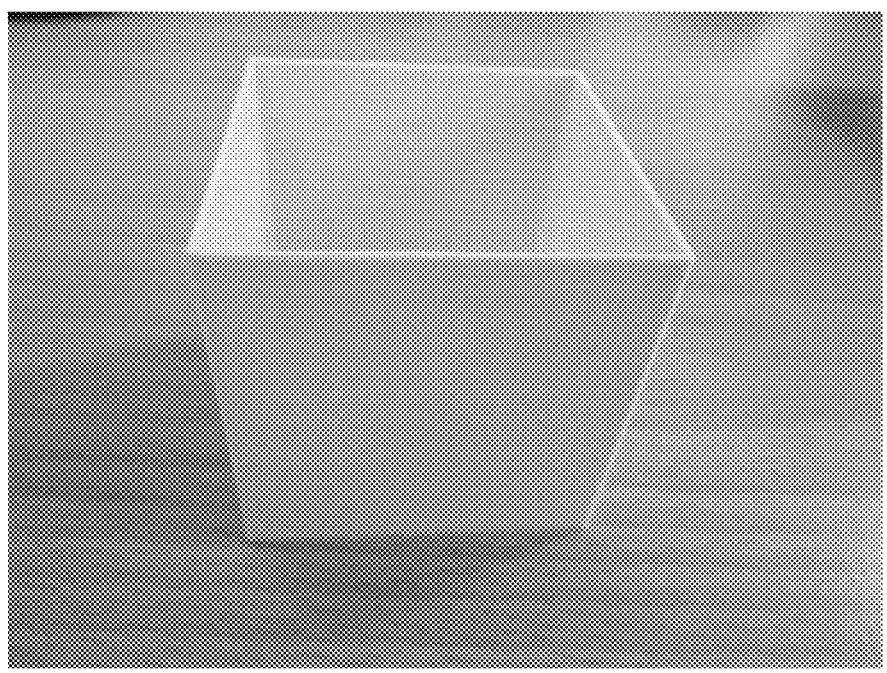
FIG. 9 represents a photograph of a 3D printed cube using commercially available MakerBot PLA filament (NatureWorks® Ingeo™ 4043D PLA) in neon green (comparative example).

As a comparative example, another cube was printed under the same conditions described herein above, using commercially available MakerBot PLA filament (NatureWorks® Ingeo™ 4043D PLA) in neon green. FIG. 9 shows the resulting opaque printed cube.

Figure 10:
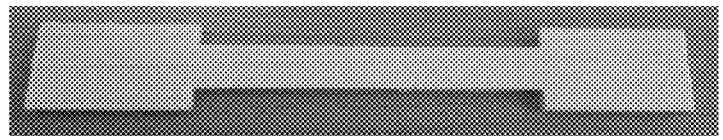
FIG. 10 represents a photograph of a dumbbell that was cut from the printed cube shown in FIG. 9.
Figure 11:
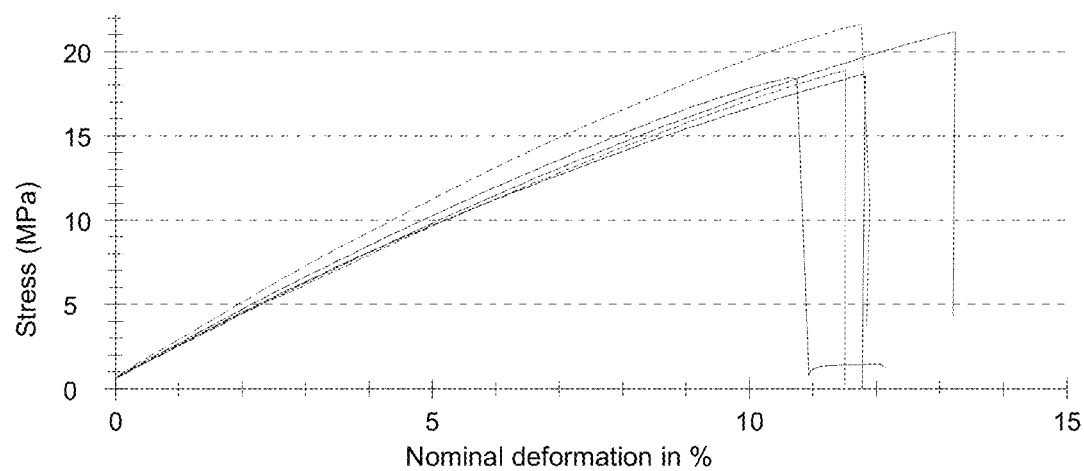
FIG. 11 represents a graph plotting the stress (MPa) measured as a function of the nominal deformation and as a function of time for dumbbells cut from the 3D printed cube shown in FIG. 9.

Perpendicularly cut dumbbells-shape tensile bars (FIG. 10) (I=11, Le=5 mm) were obtained from the comparative example printed cube according to ISO D-882 standard. The tensile properties were measured according to ISO D-882 standard at tensile speed of 5 mm/min. The results are shown in FIG. 11. It can be seen that it was possible to separate the parallel printed layers by applying only about 20 MPa.

Figure 12:
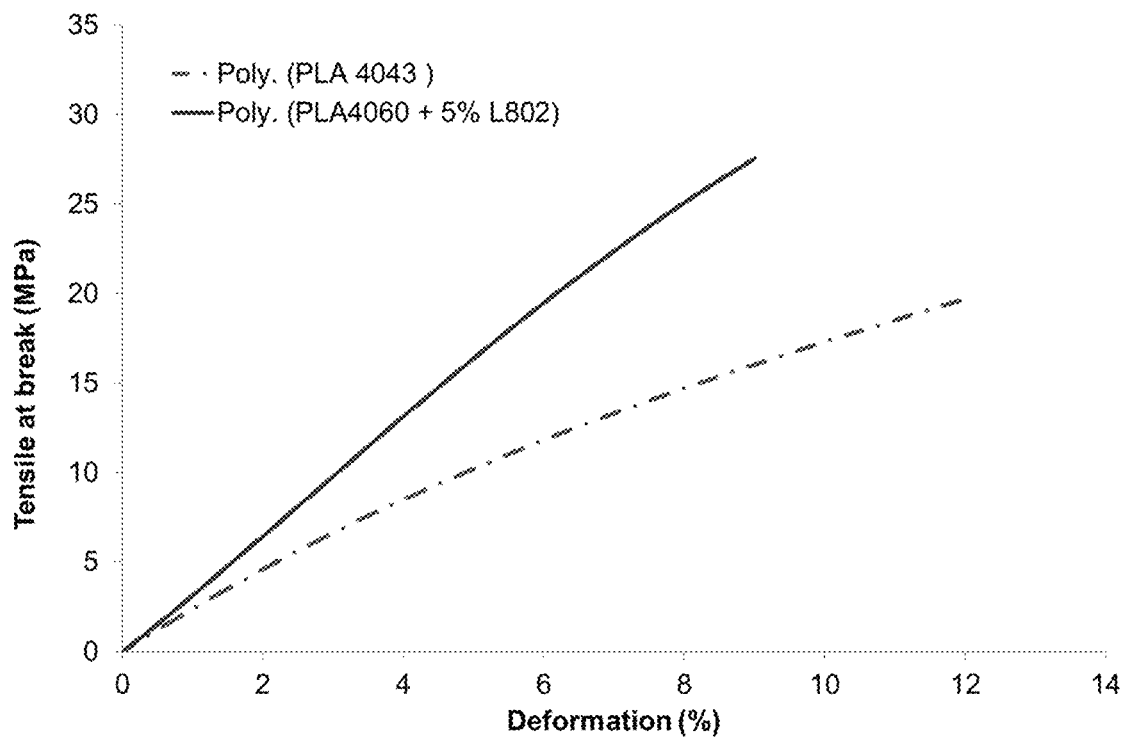
FIG. 12 represents a graph showing the tension at break measured as a function of % of deformation of dumbbells cut from a 3D printed cube using comprising a composition according to the invention, and a comparative example.

Dumbbell-shape tensile bars (I=11, Le=5 mm) according to ISO D-882 standard were obtained from the printed cube according to the invention. The tensile properties were measured according to ISO D-882 standard at tensile speed of 5 mm/min. FIG. 12 shows the results of the test, giving the tensile of 3D printed dumbbells and showing the adhesion between fused layers, and comparing them to the results obtained with the comparative dumbbells. It can be seen that it was possible to separate the parallel printed layers of the comparative dumbbells by applying only about 20 MPa, while at least 27 MPa were necessary to start separating the parallel printed layers of the dumbbells according to the invention. This results demonstrate that a 3D printed object printed using a composition according to the invention has improved adhesion between the filament fused layers, which allows to print more complex shapes that require better adhesion, such as reclined shapes or circular shapes.

The invention claimed is:

1. A composition comprising:
(a) at least one poly-lactide comprising polymer selected from the group consisting of poly-lactide, poly-lactide-polybutadiene block copolymer, poly-lactide-urethane-polybutadiene block copolymer, poly-lactide-urethane, and mixtures thereof;
(b) at least one compound of formula (I),

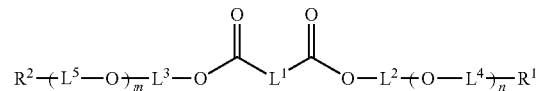

wherein,
$L^1$ is $C_{1-8}$ alkylene or $C_{3-6}$ cycloalkylene
$L^2$ is $C_{1-6}$ alkylene;
$L^3$ is $C_{1-6}$ alkylene;
$L^4$ is $C_{1-6}$ alkylene;
$L^5$ is $C_{1-6}$ alkylene;
n is an integer selected from 1, 2, 3 or 4;
m is an integer selected from 1, 2, 3 or 4;
$R^1$ is H or $C_{1-6}$alkyl;
$R^2$ is H or $C_1$-6alkyl;
wherein the poly-lactide in said poly-lactide comprising polymer is selected from the group consisting of poly-L-lactide comprising a content of D isomer of at least 25% by weight based on the total weight of the poly-L-lactide; poly-D-lactide comprising a content of L isomer of at least 25% by weight based on the total weight of the poly-D-lactide; and mixtures thereof.

2. The composition according to claim 1, wherein said composition comprises at least one compound of formula (I), wherein,
$L^1$ is $C_{1-8}$ alkylene;
m is selected from 1 or 2;
n is selected from 1 or 2.

3. The composition according to claim 1, wherein said at least one compound of formula (I) is selected from the group consisting of bis(2-(2-butoxyethoxy)ethyl)adipate, bis(2-butoxyethyl)succinate; bis(2-(2-butoxyethoxy)ethyl)pimelate, bis(2-(2-(2-butoxyethoxy)ethoxy)ethyl)adipate, bis(2-butoxyethyl)adipate, bis(2-(2-(2-butoxyethoxy)ethoxy)ethyl) glutarate, bis(2-(2-(2-butoxyethoxy)ethoxy)ethyl)succinate, and bis(2-(2-butoxyethoxy)ethyl)succinate.

4. The composition according to claim 1, wherein said composition comprises at least 40% by weight of said at least one poly-lactide comprising polymer based on the total weight of the composition.

5. The composition according to claim 1, wherein said composition comprises at least 3% by weight of said at least one compound of formula (I) based on the total weight of the composition.

6. The composition according to claim 1, wherein said composition comprises at least 40% by weight of poly-lactide comprising polymer based on the total weight of the composition and at least 15% by weight of said compound of formula (I) based on the total weight of the composition.

7. A process for preparing a composition comprising:

contacting at least one poly-lactide comprising polymer with at least one compound of formula (I),

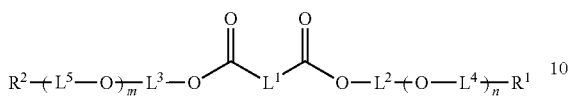

wherein said at least one poly-lactide comprising polymer is selected from the group consisting of poly-lactide, poly-lactide-polybutadiene block copolymer, poly-lactide-urethane-polybutadiene block copolymer, poly-lactide-urethane, and mixtures thereof; and wherein, $L^1$ is $C_{1-8}$ alkylene or $C_{3-6}$ cycloalkylene;
$L^2$ is $C_{1-6}$ alkylene;
$L^3$ is $C_{1-6}$ alkylene;
$L^4$ is $C_{1-6}$ alkylene;
$L^5$ is $C_{1-6}$ alkylene;
n is an integer selected from 0, 1, 2, 3 or 4;
m is an integer selected from 0, 1, 2, 3 or 4;
$R^1$ is H or $C_{1-6}$ alkyl;
$R^2$ is H or $C_{1-6}$ alkyl;
wherein the poly-lactide in said poly-lactide comprising polymer is selected from the group consisting of poly-L-lactide comprising a content of D isomer of at least 25% by weight based on the total weight of the poly-L-lactide; poly-D-lactide comprising a content of L isomer of at least 25% by weight based on the total weight of the poly-D-lactide; and mixtures thereof.

8. The process according to claim 7, wherein said contacting step comprises melt blending the at least one poly-lactide comprising polymer with the at least one compound of formula (I).

9. The process according to claim 8, wherein said composition is melt blended at a temperature ranging from 120° C. to 230° C.

10. A process comprising:

forming a composition by contacting at least one poly-lactide comprising polymer with at least one compound of formula (I),

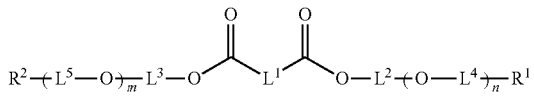

wherein said at least one poly-lactide comprising polymer is selected from the group consisting of poly-lactide, poly-lactide-polybutadiene block copolymer, poly-lactide-urethane-polybutadiene block copolymer, poly-lactide-urethane, and mixtures thereof; and $L^1$ is $C_{1-8}$ alkylene or $C_{3-6}$ cycloalkylene;
$L^2$ is $C_{1-6}$ alkylene;
$L^3$ is $C_{1-6}$ alkylene;
$L^4$ is $C_{1-6}$ alkylene;
$L^5$ is $C_{1-6}$ alkylene;
n is an integer selected from 0, 1, 2, 3 or 4;
m is an integer selected from 0, 1, 2, 3 or 4;
$R^1$ is H or $C_{1-6}$ alkyl;
$R^2$ is H or $C_{1-6}$ alkyl;
wherein the poly-lactide in said poly-lactide comprising polymer is selected from the group consisting of poly-L-lactide comprising a content of D isomer of at least 25% by weight based on the total weight of the poly-L-lactide; poly-D-lactide comprising a content of L isomer of at least 25% by weight based on the total weight of the poly-D-lactide; and mixtures thereof; and forming from the composition polymers, membranes, adhesives, foams, sealants, molded articles, films, extruded articles, fibers, elastomers, polymer based additives, pharmaceutical and biomedical products, varnishes, paints, coatings, inks, composite material, organic LEDs, organic semiconductors, conducting organic polymers, or 3D printed articles.

11. An article formed from the process according to claim 7.

12. A 3D printed article formed using a process according to claim 7.

13. A process for reshaping or repairing an article comprising:

forming a composition by contacting at least one poly-lactide comprising polymer with at least one compound of formula (I),

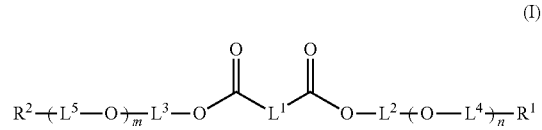

wherein said at least one poly-lactide comprising polymer is selected from the group consisting of poly-lactide, poly-lactide-polybutadiene block copolymer, poly-lactide-urethane-polybutadiene block copolymer, poly-lactide-urethane, and mixtures thereof; and $L^1$ is $C_{1-8}$ alkylene or $C_{3-6}$ cycloalkylene;
$L^2$ is $C_{1-6}$ alkylene;
$L^3$ is $C_{1-6}$ alkylene;
$L^4$ is $C_{1-6}$ alkylene;
$L^5$ is $C_{1-6}$ alkylene;
n is an integer selected from 0, 1, 2, 3 or 4;
m is an integer selected from 1, 2, 3 or 4;
$R^1$ is H or $C_{1-6}$ alkyl;
$R^2$ is H or $C_{1-6}$ alkyl;
wherein the poly-lactide in said poly-lactide comprising polymer is selected from the group consisting of poly-L-lactide comprising a content of D isomer of at least 25% by weight based on the total weight of the poly-L-lactide; poly-D-lactide comprising a content of L isomer of at least 25% by weight based on the total weight of the poly-D-lactide; and mixtures thereof;
forming an article from the composition;
separating the article into parts; and
contacting the parts of the article to be reshaped or repaired with each other.

14. The composition of claim 1, wherein the $L^1$ $C_{1-8}$ alkylene or $C_{3-6}$ cycloalkylene is substituted with one or more $C_{1-4}$ alkyls.

15. The process of claim 7, wherein the $L^1$ $C_{1-8}$ alkylene or $C_{3-6}$ cycloalkylene is substituted with one or more $C_{1-4}$ alkyls.

* * * * *